（12） United States Patent
Jung et al.

(10) Patent No.: US 12,282,628 B2
(45) Date of Patent: Apr. 22, 2025

(54) DISPLAY DEVICE

(71) Applicant: Samsung Display Co., Ltd., Yongin-Si (KR)

(72) Inventors: Keumdong Jung, Yongin-si (KR); Jaesang Kim, Yongin-si (KR); Jiwoong Kim, Yongin-si (KR); Hyunggun Ma, Yongin-si (KR); Taehun Lee, Yongin-si (KR); Moonjae Jeong, Yongin-si (KR); Sanghyun Heo, Yongin-si (KR)

(73) Assignee: Samsung Display Co. Ltd., Yongin-si (KR)

( * ) Notice: Subject to any disclaimer, the term of this patent is extended or adjusted under 35 U.S.C. 154(b) by 16 days.

(21) Appl. No.: 18/213,956

(22) Filed: Jun. 26, 2023

(65) Prior Publication Data
US 2023/0419913 A1 Dec. 28, 2023

(30) Foreign Application Priority Data
Jun. 24, 2022 (KR) .......................... 10-2022-0077344

(51) Int. Cl.
*G09G 3/3275* (2016.01)
*G06F 3/041* (2006.01)
(Continued)

(52) U.S. Cl.
CPC ........ *G06F 3/04184* (2019.05); *G06F 3/0412* (2013.01); *G06F 3/0416* (2013.01); *G09G 3/32* (2013.01); *G09G 3/3275* (2013.01); *G06F 3/04166* (2019.05); *G06F 3/0446* (2019.05); *G09G 3/20* (2013.01); *G09G 2310/0264* (2013.01); *G09G 2310/0267* (2013.01); *G09G 2310/027* (2013.01);
(Continued)

(58) Field of Classification Search
CPC .... G09G 2310/0267; G09G 3/20; G09G 3/32; G09G 3/3208; G09G 3/3275; G09G 2300/0814; G09G 2310/0264; G09G 2310/027; G09G 2310/0291; G09G 2310/0297; G09G 2310/08; G09G 2320/0276; G09G 2320/0673; G09G 2354/00; G06F 3/0412; G06F 3/0416; G06F 3/04166; G06F 3/04184; G06F 3/0446
See application file for complete search history.

(56) References Cited

U.S. PATENT DOCUMENTS 10,078,392 B2  9/2018 Huang et al.
10,614,279 B2  4/2020 Kim et al.
(Continued)

FOREIGN PATENT DOCUMENTS

KR  10-1809576     12/2017
KR  10-2021-0046520  4/2021

*Primary Examiner* — Julie Anne Watko
(74) *Attorney, Agent, or Firm* — F. CHAU & ASSOCIATES, LLC

(57) ABSTRACT

A display device including: a display panel including a plurality of pixels; an input sensor disposed on the display panel and including detection electrodes; a data driving circuit configured to output data signals or detection driving signals; and a selection circuit configured to provide the data signals to the plurality of pixels in response to a first enable signal and provide the detection driving signals to the detection electrodes in response to a second enable signal.

20 Claims, 20 Drawing Sheets

(51) Int. Cl.
    *G06F 3/044*     (2006.01)
    *G09G 3/22*     (2006.01)
    *G09G 3/32*     (2016.01)
    *G09G 3/20*     (2006.01)

(52) U.S. Cl.
    CPC ............ *G09G 2310/0291* (2013.01); *G09G 2310/0297* (2013.01); *G09G 2310/08* (2013.01); *G09G 2354/00* (2013.01)

(56) References Cited

U.S. PATENT DOCUMENTS

| | | |
|---|---|---|
| 11,209,926 B2 | 12/2021 | Nohtomi et al. |
| 11,442,572 B2 | 9/2022 | Kim et al. |
| 2018/0164943 A1* | 6/2018 | Hung .................. G06F 3/04166 |
| 2018/0349667 A1* | 12/2018 | Kim ........................ G09G 5/00 |
| 2021/0117035 A1* | 4/2021 | Kim .................. G06V 40/1306 |

* cited by examiner

DISPLAY DEVICE

CROSS-REFERENCE TO RELATED APPLICATION

This U.S. non-provisional patent application claims priority under 35 U.S.C. § 119 to Korean Patent Application No. 10-2022-0077344, filed on Jun. 24, 2022, the disclosure of which is incorporated by reference herein in its entirety.

TECHNICAL FIELD

The present disclosure relates to a display device, and more particularly, to a display device having a sensing function.

DISCUSSION OF RELATED ART

A display device is an output device for presentation of information in visual form. Multimedia electronic devices such as televisions, mobile phones, tablets, computers, navigation systems, game machines, and the like have display devices for displaying images. In addition to the usual input methods such as buttons, a keyboard, and a mouse, display devices may include an input sensor that can detect touch or near proximity of a user or an object.

SUMMARY

The present disclosure aims to simplify the configuration of a driving system required to drive a display device with a sensing function and to reduce a circuit size thereof.

An embodiment of the inventive concept provides, a display device including: a display panel including a plurality of pixels; an input sensor disposed on the display panel and including detection electrodes; a data driving circuit configured to output data signals or detection driving signals; and a selection circuit configured to provide the data signals to the plurality of pixels in response to a first enable signal and provide the detection driving signals to the detection electrodes in response to a second enable signal.

An embodiment of the inventive concept provides, a display device including: a display panel including a plurality of pixels; an input sensor disposed on the display panel and including detection electrodes; and a driving integrated circuit connected to the display panel and the input sensor, wherein the driving integrated circuit includes: a data driving circuit configured to output data signals or detection driving signals, and a selection circuit configured to provide the data signals to the plurality of pixels in response to a first enable signal and provide the detection driving signals to the first detection electrodes in response to a second enable signal.

An embodiment of the inventive concept provides, a display device including: a display panel including a plurality of pixels; an input sensor disposed on the display panel and including detection electrodes; a data driving circuit configured to output data signals or detection driving signals; and a selection circuit configured to provide the data signals to the plurality of pixels in response to a first enable signal that is provided to gate electrodes of transistors of a first switching circuit and provide the detection driving signals to the detection electrodes in response to a second enable signal that is provided to gate electrodes of transistors of a second switching circuit.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION OF THE EMBODIMENTS

Figure 1:
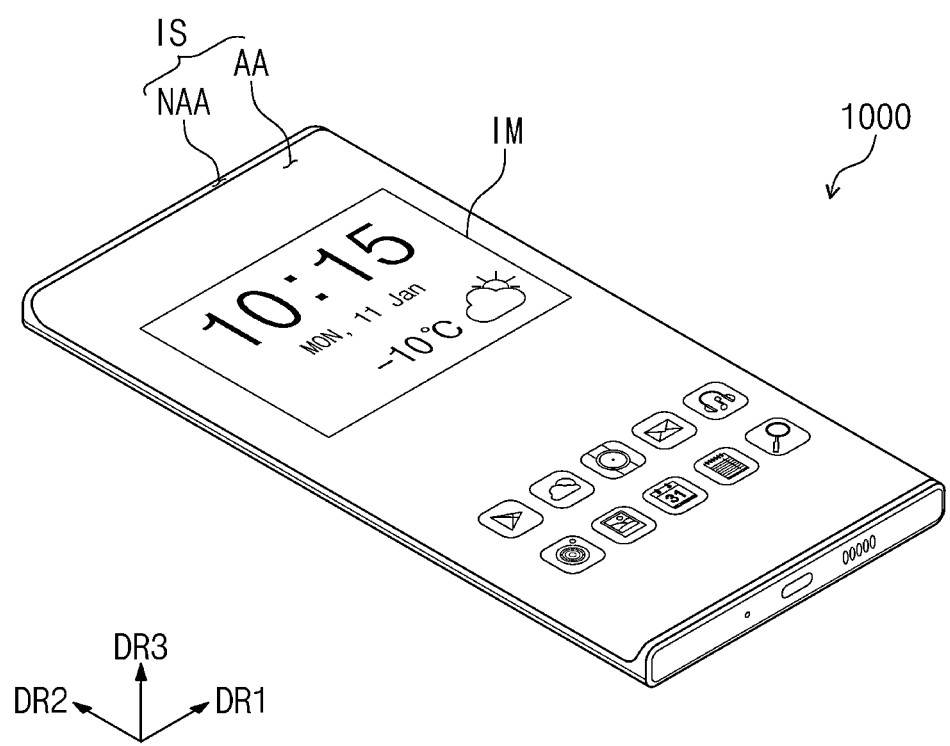
FIG. 1 is a perspective view of a display device according to an embodiment of the inventive concept.

In this specification, when an element (or region, layer, part, component, etc.) is referred to as being "on", "connected to", or "coupled to" another element, it means that it may be directly placed on/connected to/coupled to other elements, or a third element may be arranged between them.

Like reference numerals may refer to like elements. Additionally, in the drawings, the thicknesses, proportions, and dimensions of components may be exaggerated for effective description. "And/or" includes all of one or more combinations defined by related components.

It will be understood that the terms "first" and "second" are used herein to describe various components but these components should not be limited by these terms. The above terms are used to distinguish one component from another. For example, a first component may be referred to as a second component and vice versa. The terms of a singular form may include plural forms unless otherwise specified.

In addition, terms such as "below", "the lower side", "on", and "the upper side" are used to describe a relationship of components shown in the drawings. The terms are described as a relative concept based on a direction shown in the drawings.

In various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as commonly understood by one of ordinary skill in the art to which this inventive concept belongs. In addition, terms such as terms defined in commonly used dictionaries should be interpreted as having a meaning consistent with their meaning in the context of the related technology, and it should not be construed in an overly ideal or overly formal sense unless explicitly defined here.

Hereinafter, embodiments of the inventive concept will be described with reference to the drawings.

FIG. 1 is a perspective view of a display device according to an embodiment of the inventive concept.

Referring to FIG. 1, a display device 1000 may be a device that is activated according to an electrical signal. For example, the display device 1000 may be a smartphone, a foldable smartphone, a laptop computer, a television, a tablet, a car navigation system, a game console, or a wearable device, but is not particularly limited thereto. FIG. 1 illustrates that the display device 1000 is a smartphone.

The display device 1000 has a rectangular shape having a short side in a first direction DR1 and a long side in a second direction DR2 crossing the first direction DR1. However, the shape of the display device 1000 is not limited thereto, and various shapes of the display device 1000 may be provided. The display device 1000 may display an image IM in a third direction DR3 on a display surface IS parallel to each of the first and second directions DR1 and DR2. The display surface IS on which the image IM is displayed may correspond to a front surface of the display device 1000.

In this embodiment, the front (or upper surface) and the rear surface (or lower surface) of each member may be defined based on the direction in which the image IM is displayed. The front and rear surfaces are opposing to each other in the third direction DR3, and a normal direction of each of the front and rear surfaces may be parallel to the third direction DR3.

The separation distance between the front and rear surfaces in the third direction DR3 may correspond to the thickness of the display device 1000 in the third direction DR3. Moreover, the directions indicated by the first to third directions DR1, DR2, and DR3 are relative concepts and may be converted to other directions.

The display device 1000 may sense an external input applied from the outside. The external input may include various types of inputs provided from the outside of the display device 1000. The external input may be any one or a combination of various types of external inputs, such as a part of a user's body, light, heat, gaze, or pressure. In addition, the display device 1000 may sense an external input applied to the side or rear surface of the display device 1000 depending on the structure of the display device 1000, and the inventive concept is not limited thereto. As an example of the inventive concept, the external input may include an input by an external device (e.g., a stylus pen, an active pen, a touch pen, an electronic pen, an e-pen, a digitizer, etc.).

The display surface IS of the display device 1000 may include an active area AA and a peripheral area NAA. The display device 1000 may display the image IM through the active area AA. The peripheral area NAA is adjacent to the active area AA and may be an area in which an image is not substantially displayed. The peripheral area NAA may surround the active area AA.

Figure 2:
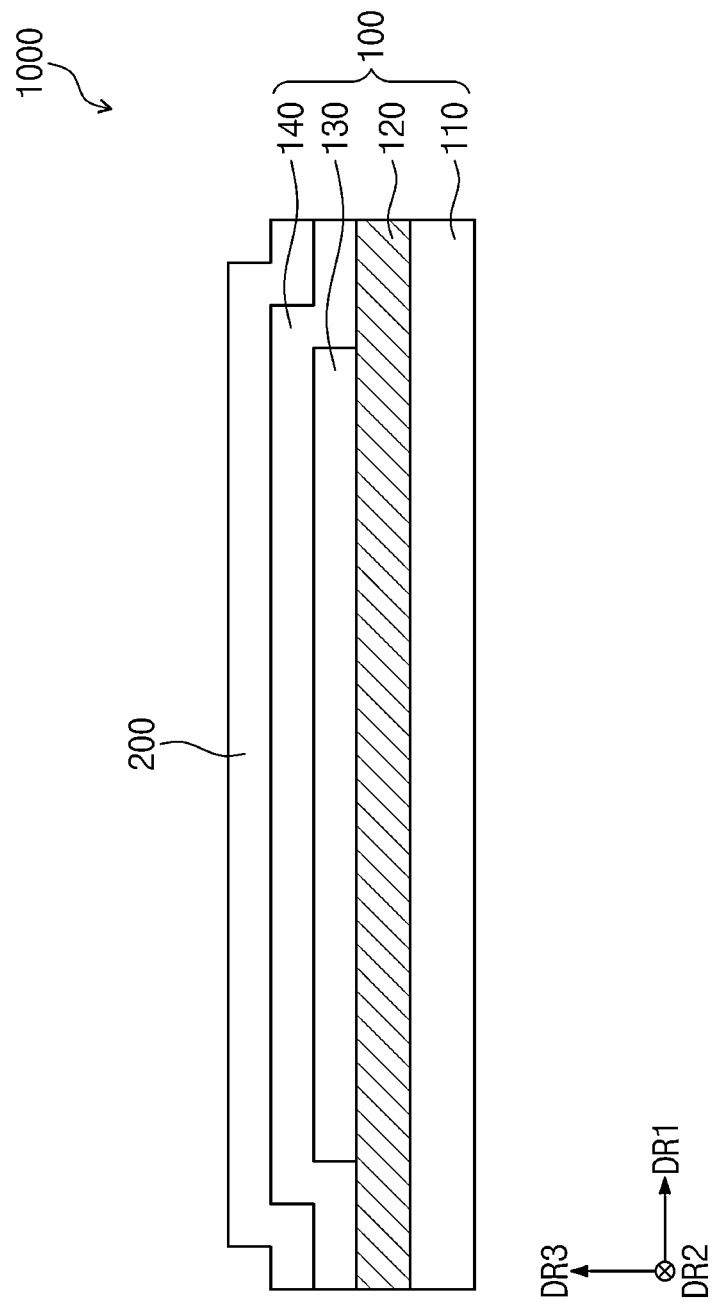
FIG. 2 is a cross-sectional view of a display device according to an embodiment of the inventive concept.

FIG. 2 is a cross-sectional view of a display device according to an embodiment of the inventive concept.

Referring to FIG. 2, a display device 1000 may include a display panel 100 and an input sensor 200. The display panel 100 may include a base layer 110, a circuit layer 120, a light emitting element layer 130, and an encapsulation layer 140.

The base layer 110 may be a member that provides a base surface on which the circuit layer 120 is disposed. The base layer 110 may include a glass material, a metal material, or a polymer material. However, the embodiment of the inventive concept is not limited thereto, and the base layer 110 may include an inorganic layer, an organic layer, or a composite material layer.

The base layer 110 may have a multilayer structure. For example, the base layer 110 may include a first synthetic resin layer and a second synthetic resin layer disposed on the first synthetic resin layer. Each of the first and second synthetic resin layers may include a polyimide-based resin. In addition, each of the first and second synthetic resin layers may include at least one of acrylic resin, methacrylate resin, polyisoprene resin, vinyl resin, epoxy resin, urethane resin, cellulose resin, siloxane resin, polyamide resin, and perylene resin. The base layer 110 may also be referred to as a base substrate.

The circuit layer 120 may be disposed on the base layer 110. The circuit layer 120 may include an insulating layer, a semiconductor pattern, a conductive pattern, and a signal wire. An insulating layer, a semiconductor layer, and a conductive layer are formed on the base layer 110 by a method such as coating and deposition, and thereafter, the insulating layer, the semiconductor layer, and the conductive layer may be selectively patterned through a plurality of photolithography processes. After that, a semiconductor pattern, a conductive pattern, and a signal wire included in the circuit layer 120 may be formed.

The light emitting element layer 130 may be disposed on the circuit layer 120. The light emitting element layer 130 may include a plurality of light emitting elements. For example, the light emitting element layer 130 may include an organic light emitting material, an inorganic light emitting material, quantum dots, quantum rods, micro light emitting diodes (LEDs), or nano LEDs.

The encapsulation layer 140 may be disposed on the light emitting element layer 130. The encapsulation layer 140 may protect the light emitting element layer 130 from foreign substances such as moisture, oxygen, and dust particles.

The input sensor 200 may be disposed on the display panel 100. The input sensor 200 may be configured to detect an external input (e.g., touch, proximity, a finger, etc.) applied from the outside. The input sensor 200 may be formed on the display panel 100 through a continuous process. In this case, it may be expressed that the input sensor 200 is directly disposed on the display panel 100. "Directly disposed" may mean that a third component is not disposed between the input sensor 200 and the display panel 100. In other words, a separate adhesive layer may not be disposed between the input sensor 200 and the display panel 100. Optionally, the input sensor 200 may be coupled to the display panel 100 through an adhesive layer. The adhesive layer may be a conventional adhesive or pressure-sensitive adhesive.

The display device 1000 may further include an anti-reflection layer and a light control layer disposed on the input sensor 200. The anti-reflection layer may reduce reflectance of external light incident from the outside of the display device 1000. The light control layer may control the direction of the light incident from the display panel 100 to improve the front luminance of the display device 1000.

Figure 3:
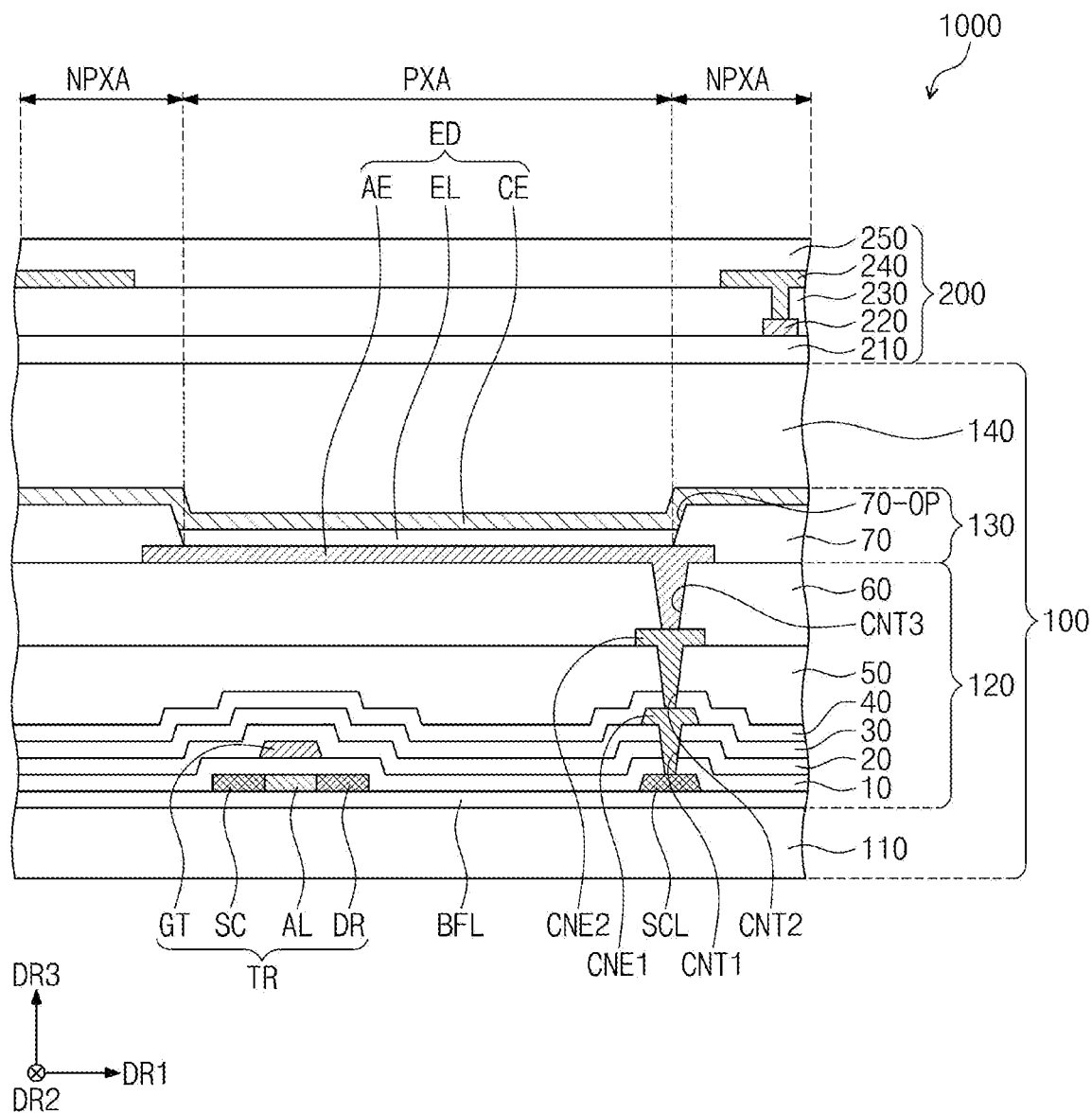
FIG. 3 is a cross-sectional view of a display panel and an input sensor according to an embodiment of the inventive concept.

FIG. 3 is a cross-sectional view of a display panel and an input sensor according to an embodiment of the inventive concept.

Referring to FIG. 3, a display panel 100 may include a base layer 110. At least one inorganic layer may be formed on the upper surface of the base layer 110. The inorganic layer may include at least one of aluminum oxide, titanium oxide, silicon oxide, silicon nitride, silicon oxynitride, zirconium oxide, and hafnium oxide. The inorganic layer may be formed in multiple layers. The multi-layered inorganic layers may constitute a barrier layer and/or a buffer layer BFL. In this embodiment, the display panel 100 is shown to include the buffer layer BFL.

The buffer layer BFL may improve the bonding force between the base layer 110 and a semiconductor pattern. The buffer layer BFL may include at least one of silicon oxide, silicon nitride, and silicone oxynitride. For example, the buffer layer BFL may have a structure in which a silicon oxide layer and a silicon nitride layer are alternately stacked.

The semiconductor pattern may be disposed on the buffer layer BFL. The semiconductor pattern may include polysilicon. However, the embodiment of the inventive concept is not limited thereto, and the semiconductor pattern may include amorphous silicon, low-temperature polycrystalline silicon, or an oxide semiconductor.

FIG. 3 illustrates only some semiconductor patterns, and semiconductor patterns may be further disposed in other areas. The semiconductor pattern may be arranged in a specific rule across a plurality of pixels. The semiconductor pattern may have different electrical properties depending on whether it is doped or not. The semiconductor pattern may include a first area having high conductivity and a second area having low conductivity. The first area may be doped with an N-type dopant or a P-type dopant. A P-type transistor may include a doping area doped with a P-type dopant, and an N-type transistor may include a doping area doped with an N-type dopant. The second area may be a non-doped area or a doped area at a lower concentration than the first area.

The conductivity of the first area is greater than that of the second area, and may serve as an electrode or a signal wire. The second area may correspond to a channel area of a transistor. In other words, a portion of the semiconductor pattern may be a channel portion of the transistor, another portion of the semiconductor pattern may be a source portion or a drain portion of the transistor, and yet another portion of the semiconductor pattern may be a connection electrode or a connection signal wire.

Each of the pixels may have an equivalent circuit including seven transistors, one capacitor, and a light emitting element ED, and the equivalent circuit diagram of the pixel may be modified in various forms. In FIG. 3, one transistor TR and the light emitting element ED included in a pixel are illustrated by way of example.

A source portion SC, a channel portion AL, and a drain portion DR of the transistor TR may be formed from the semiconductor pattern. The source portion SC and the drain portion DR may extend in opposite directions from the channel portion AL in a cross-sectional view. FIG. 3 illustrates a part of a connection signal wire SCL formed from the semiconductor pattern. The connection signal wire SCL may be connected to the drain portion DR of the transistor TR on a plane.

A first insulating layer 10 may be disposed on the buffer layer BFL. The first insulating layer 10 may overlap a plurality of pixels in common and cover a semiconductor pattern. The first insulating layer 10 may be an inorganic layer and/or an organic layer, and may have a single layer or multilayer structure. The first insulating layer 10 may include at least one of aluminum oxide, titanium oxide, silicon oxide, silicon nitride, silicon oxynitride, zirconium oxide, and hafnium oxide. In this embodiment, the first insulating layer 10 may be a single-layer silicon oxide layer. In addition to the first insulating layer 10, each of the insulating layers included in the circuit layer 120 to be described later may be an inorganic layer and/or an organic layer, and may have a single-layer or multi-layer structure. The inorganic layer may include at least one of the above-mentioned materials, but is not limited thereto.

A gate GT of the transistor TR is disposed on the first insulating layer 10. The gate GT may be a part of the metal pattern. The gate GT overlaps the channel portion AL. In the process of doping the semiconductor pattern, the gate GT may function as a mask.

A second insulating layer 20 is disposed on the first insulating layer 10 and may cover the gate GT. The second insulating layer 20 may overlap the pixels in common. The second insulating layer 20 may be an inorganic layer and/or an organic layer, and may have a single layer or multilayer structure. The second insulating layer 20 may include at least one of silicon oxide, silicon nitride, and silicon oxynitride. In this embodiment, the second insulating layer 20 may have a multilayer structure including a silicon oxide layer and a silicon nitride layer.

A third insulating layer 30 may be disposed on the second insulating layer 20. The third insulating layer 30 may have a single layer or multilayer structure. For example, the third insulating layer 30 may have a multilayer structure including a silicon oxide layer and a silicon nitride layer.

A first connection electrode CNE1 may be disposed on the third insulating layer 30. The first connection electrode CNE1 may be connected to the connection signal wire SCL through a first contact hole CNT1 penetrating the first, second, and third insulating layers 10, 20, and 30.

A fourth insulating layer 40 may be disposed on the third insulating layer 30. The fourth insulating layer 40 may be a single layer of silicon oxide. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a second contact hole CNT2 penetrating the fourth insulating layer 40 and the fifth insulating layer 50. The second connection electrode CNE2 may overlap the first connection electrode CNE1.

A sixth insulating layer 60 is disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element ED. For example, the light emitting element layer 130 may include an organic light emitting material, an inorganic light emitting material, quantum dots, quantum rods, micro LEDs, or nano LEDs. Hereinafter, a description will be given that the light emitting element ED is an organic light emitting element, but it is not particularly limited thereto.

The light emitting element ED may include a first electrode AE, a light emitting layer EL, and a second electrode CE.

The first electrode AE may be disposed on the sixth insulating layer 60. The first electrode AE may be connected to the second connection electrode CNE2 through a third contact hole CNT3 penetrating the sixth insulating layer 60.

A pixel defining film 70 is disposed on the sixth insulating layer 60 and may cover a portion of the first electrode AE. An opening part 70-OP is defined in the pixel defining film 70. The opening part 70-OP of the pixel defining film 70 exposes at least a portion of the first electrode AE.

The active area AA (see FIG. 1) may include an emission area PXA and a non-emission area NPXA adjacent to the emission area PXA. The non-emission area NPXA may surround the emission area PXA. In this embodiment, the emission area PXA corresponds to a partial area of the first electrode AE exposed by the opening part 70-OP.

The light emitting layer EL may be disposed on the first electrode AE. The light emitting layer EL may be disposed in an area corresponding to the opening part 70-OP. In other words, the light emitting layer EL may be formed separately in each of the plurality of pixels. When the light emitting layer EL is formed in plural by being separated from each of the plurality of pixels, each of the plurality of light emitting layers EL may emit light of at least one color of blue, red, and green. However, the embodiment of the inventive concept is not limited thereto, and the plurality of light emitting layers EL may be connected to each other and provided in common to the plurality of pixels. In this case, the light emitting layer EL provided in common to the plurality of pixels may provide blue light or white light.

The second electrode CE may be disposed on the light emitting layer EL. The second electrode CE may be formed in plural by being separated from each of the plurality of pixels. Alternatively, a plurality of second electrodes CE may be connected to each other and disposed in common in the plurality of pixels.

A hole control layer may be disposed between the first electrode AE and the light emitting layer EL. The hole control layer may be commonly disposed in the emission area PXA and the non-emission area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in a plurality of pixels using an open mask.

The encapsulation layer 140 may be disposed on the light emitting element layer 130. The encapsulation layer 140 may include an inorganic layer, an organic layer, and an inorganic layer sequentially stacked, but the layers constituting the encapsulation layer 140 are not limited thereto.

The inorganic layer may protect the light emitting element layer 130 from moisture and oxygen, and the organic layer may protect the light emitting element layer 130 from foreign substances such as dust particles. The inorganic layers may include a silicon nitride layer, a silicon oxynitride layer, a silicon oxide layer, a titanium oxide layer, or an aluminum oxide layer. The organic layer may include an acrylic organic layer, but is not limited thereto.

The input sensor 200 may include a base insulating layer 210, a first conductive layer 220, a detection insulating layer 230, a second conductive layer 240, and a cover insulating layer 250.

The base insulating layer 210 may be an inorganic layer including at least one of silicon nitride, silicon oxynitride, and silicon oxide. Alternatively, the base insulating layer 210 may be an organic layer including an epoxy resin, an acrylic resin, or an imide resin. The base insulating layer 210 may have a single layer structure or may have a multilayer structure stacked along the third direction DR3.

Each of the first conductive layer 220 and the second conductive layer 240 may have a single layer structure or may have a multilayer structure stacked along the third direction DR3.

The single-layered conductive layer may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), indium zinc tin oxide (IZTO), and the like. In addition, the transparent conductive material may include a conductive polymer such as PEDOT, metal nanowires, graphene, and the like.

The multilayered conductive layer may include metal layers. The metal layers may have a three-layer structure of, for example, titanium/aluminum/titanium. The multilayered conductive layer may include at least one metal layer and at least one transparent conductive layer.

At least one of the detection insulating layer 230 and the cover insulating layer 250 may include an inorganic layer. The inorganic layer may include at least one of aluminum oxide, titanium oxide, silicon oxide, silicon nitride, silicon oxynitride, zirconium oxide, and hafnium oxide.

At least one of the detection insulating layer 230 and the cover insulating layer 250 may include an organic layer. The organic layer may include at least one of acrylic resin, methacrylic resin, polyisoprene, vinyl resin, epoxy resin, urethane resin, cellulose resin, siloxane resin, polyimide resin, polyamide resin, and perylene resin.

Figure 4:
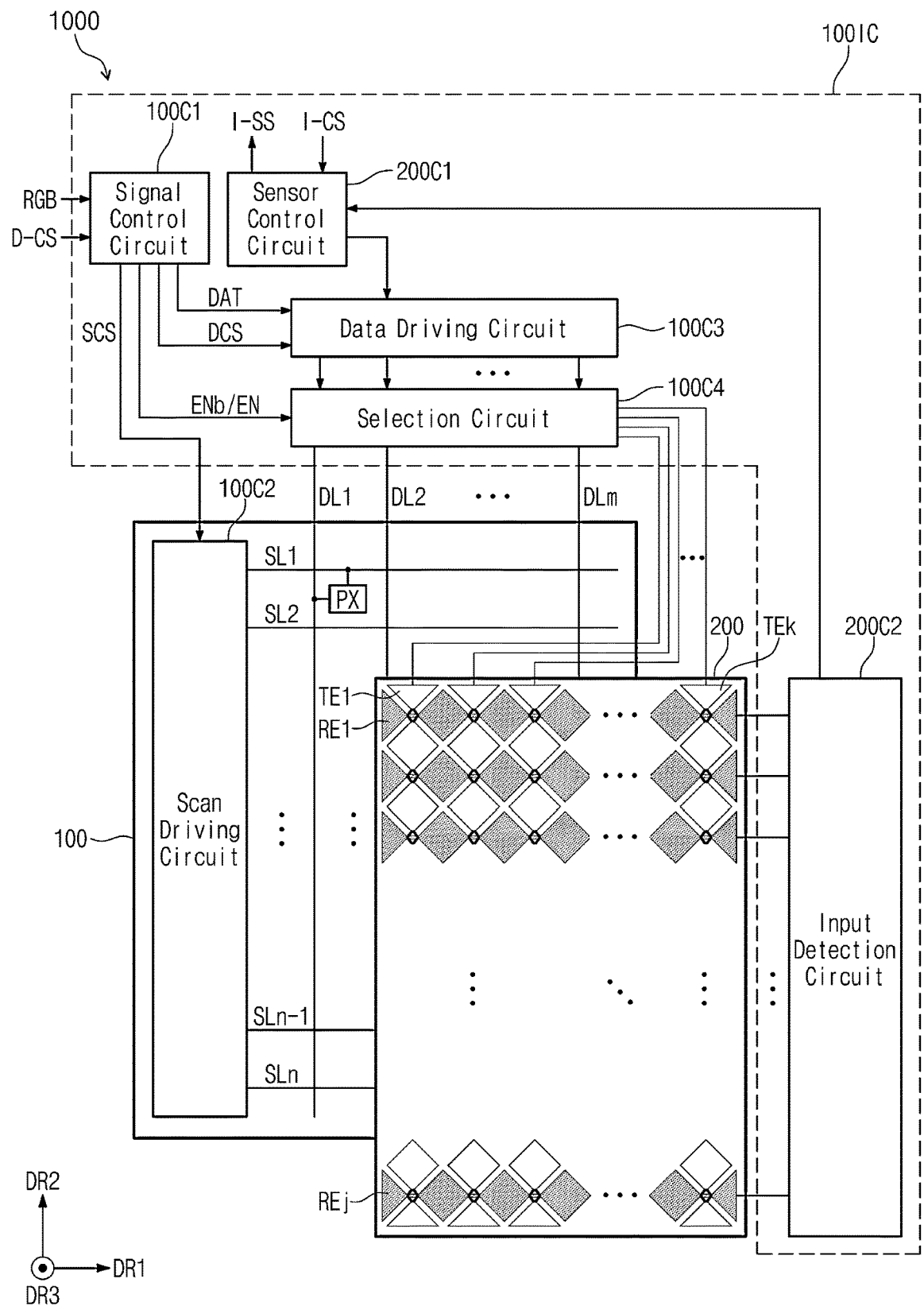
FIG. 4 is a block diagram of a display panel, an input sensor, and a driving integrated circuit according to an embodiment of the inventive concept.
Figure 5A:
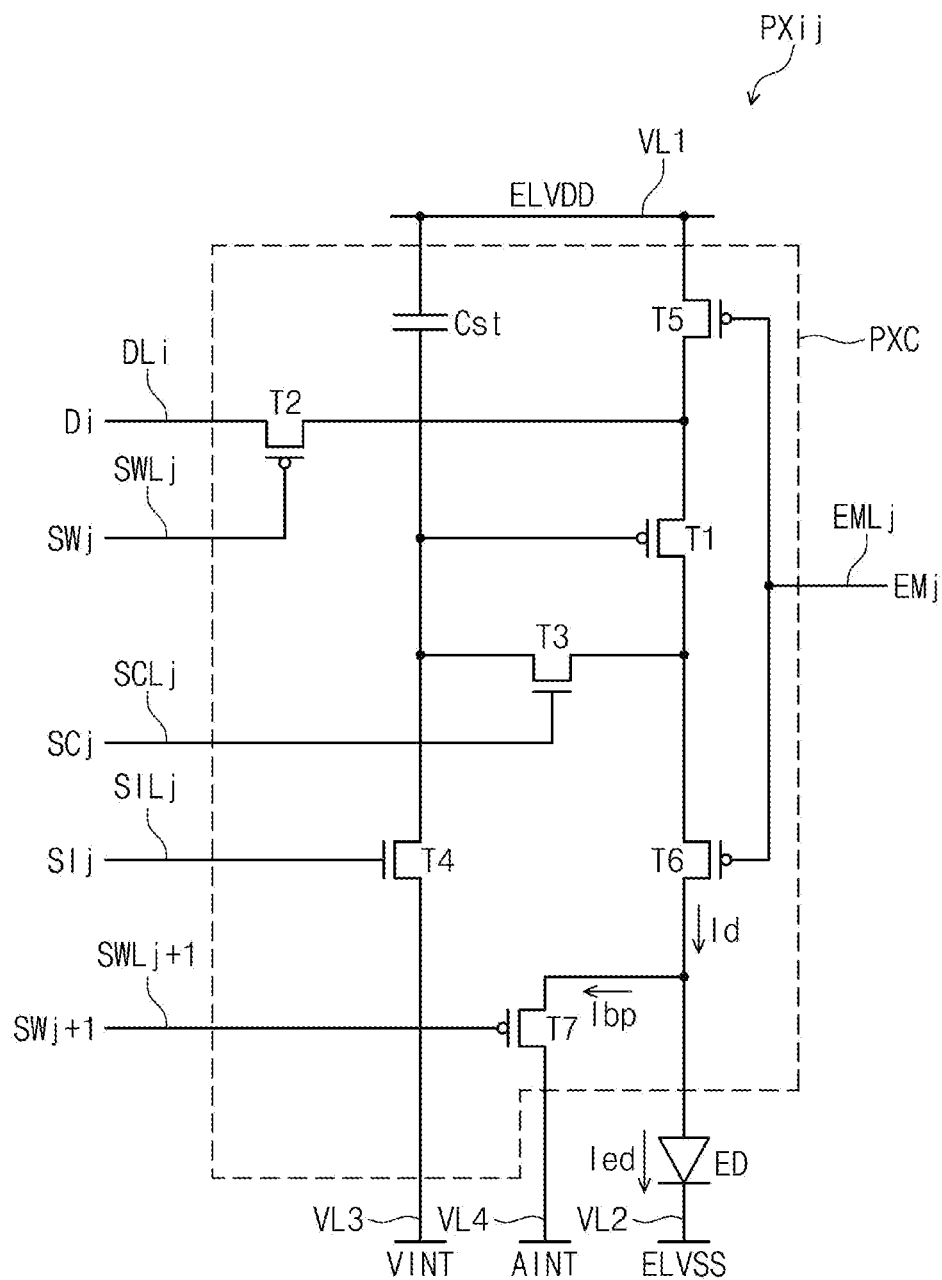
FIG. 5A is a circuit diagram of the pixel illustrated in FIG. 4.
Figure 5B:
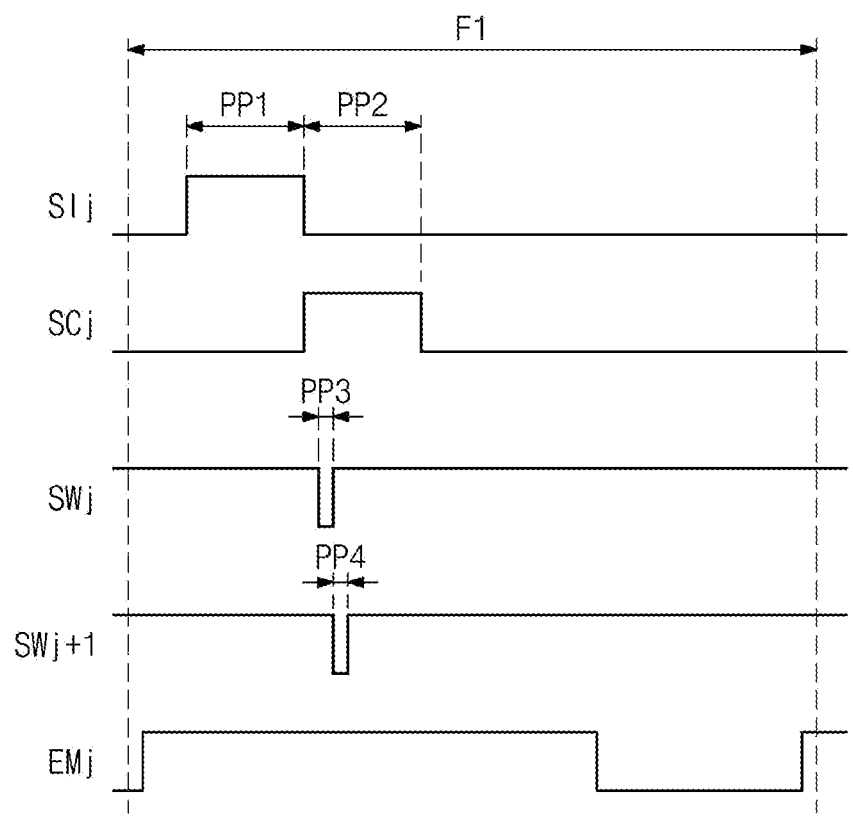
FIG. 5B is a timing diagram for explaining the operation of the pixel shown in FIG. 5A.

FIG. 4 is a block diagram illustrating a display panel, an input sensor, and a driving integrated circuit according to an embodiment of the inventive concept. FIG. 5A is a circuit diagram of the pixel illustrated in FIG. 4. FIG. 5B is a timing diagram for explaining the operation of the pixel shown in FIG. 5A.

Referring to FIG. 4, the display panel 100 may include a plurality of scan wires SL1 to SLn, a plurality of data wires DL1 to DLm, and a plurality of pixels PX. Each of the plurality of pixels PX is connected to a corresponding data wire among the plurality of data wires DL1 to DLm, and is connected to a corresponding scan wire among the plurality of scan wires SL1 to SLn. In an embodiment of the inventive concept, the display panel 100 may further include a plurality of emission control lines.

Each of the plurality of scan wires SL1 to SLn may extend along the first direction DR1, and the plurality of scan wires SL1 to SLn may be spaced apart from each other in the second direction DR2. Each of the plurality of data wires DL1 to DLm may extend along the second direction DR2, and the plurality of data wires DL1 to DLm may be spaced apart from each other in the first direction DR1.

FIG. 5A shows an equivalent circuit diagram of one pixel PXij among the plurality of pixels PX shown in FIG. 4.

Since each of the plurality of pixels PX has the same circuit structure, a detailed description of the remaining pixels will be omitted as a description of the circuit structure of the pixel PXij suffices.

The pixel PXij is connected to an i-th data wire DLi (hereinafter referred to as a data wire) among the data wires DL1 to DLm, and is connected to a j-th initialization scan line SILj (hereinafter referred to as an initialization scan line) among the scan wires SL1 to SLn, a j-th write scan line SWLj (hereinafter referred to as a first write scan line), and a (j+1)-th write scan line SWLj+1 (hereinafter referred to as a second write scan line). In addition, the pixel PXij is connected to a j-th compensation scan line SCLj (hereinafter referred to as a compensation scan line) among the scan wires SL1 to SLn. Alternatively, the pixel PXij may be connected to a separate j-th black scan line instead of the (j+1)-th write scan line SWLj+1. The pixel PXij may be connected to a j-th emission control line EMLj (hereinafter, referred to as an emission control line) among the plurality of emission control lines.

The pixel PXij includes a light emitting element ED and a pixel circuit unit PXC. The light emitting element ED may include a light emitting diode. The light emitting diode may include an organic light emitting material, an inorganic light emitting material, quantum dots, and quantum rods as a light emitting layer.

The pixel circuit unit PXC includes first to seventh transistors T1, T2, T3, T4, T5, T6, and T7 and one capacitor Cst. Each of the first to seventh transistors T1 to T7 may be a transistor having a low-temperature polycrystalline silicon (LTPS) semiconductor layer. Some of the first to seventh transistors T1 to T7 may be P-type transistors, and others of the first to seventh transistors T1 to T7 may be N-type transistors. For example, among the first to seventh transistors T1 to T7, the first, second, and fifth to seventh transistors T1, T2, T5 to T7 may be P-type transistors, and the third and fourth transistors T3 and T4 may be N-type transistors using an oxide semiconductor as a semiconductor layer. However, the configuration of the pixel circuit unit PXC is not limited to the embodiment shown in FIG. 5A. The pixel circuit unit PXC illustrated in FIG. 5A is only an example, and the configuration of the pixel circuit unit PXC may be modified and implemented. For example, all of the first to seventh transistors T1 to T7 may be P-type transistors or N-type transistors.

The initialization scan line SILj, the compensation scan line SCLj, the first and second write scan lines SWLj and SWLj+1, and the emission control line EMLj may respectively transmit a j-th initialization scan signal SIj (hereinafter referred to as initialization scan signal), a j-th compensation scan signal SCj (hereinafter referred to as compensation scan signal), j-th and j+1-th write scan signals SWj and SWj+1 (hereinafter referred to as first and second write scan signals), and a j-th emission control signal EMj (hereinafter referred to as emission control signal) to the pixel PXij. The data wire DLi transmits a data signal Di to the pixel PXij. The data signal Di may have a voltage level corresponding to a gradation of a corresponding input image signal among input image signals RGB input to the display device 1000 (refer to FIG. 4). First to fourth driving voltage lines VL1, VL2, VL3, and VL4 may respectively transmit the first driving voltage ELVDD, the second driving voltage ELVSS, the first initialization voltage VINT, and the second initialization voltage AINT to the pixel PXij.

The first transistor T1 includes a first electrode connected to the first driving voltage line VL1 through the fifth transistor T5, a second electrode electrically connected to the anode of the light emitting element ED through the sixth transistor T6, and a gate electrode connected to one end of the capacitor Cst. The first transistor T1 may receive the data signal Di transmitted from the data wire DLi according to the switching operation of the second transistor T2 and supply a driving current Id to the light emitting element ED.

The second transistor T2 includes a first electrode connected to the data wire DLi, a second electrode connected to the first electrode of the first transistor T1, and a gate electrode connected to the first write scan line SWLj. The second transistor T2 is turned on according to the first write scan signal SWj received through the first write scan line SWLj, so that the second transistor T2 may transmit the data signal Di transmitted from the data wire DLi to the first electrode of the first transistor T1.

The third transistor T3 includes a first electrode connected to the second electrode of the first transistor T1, a second electrode connected to the gate electrode of the first transistor T1, and a gate electrode connected to the compensation scan line SCLj. The third transistor T3 is turned on according to the compensation scan signal SCj received through the compensation scan line SCLj to diode-connect the first transistor T1 by connecting the gate electrode and the second electrode of the first transistor T1 to each other.

The fourth transistor T4 includes a first electrode connected to the gate electrode of the first transistor T1, a second electrode connected to the third driving voltage line VL3 to which the first initialization voltage VINT is transmitted, and a gate electrode connected to the initialization scan line SILj. The fourth transistor T4 is turned on according to the initialization scan signal SIj received through the initialization scan line SILj and transmits the first initialization voltage VINT to the gate electrode of the first transistor T1 so that an initialization operation for initializing the voltage of the gate electrode of the first transistor T1 may be performed.

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light emitting element ED, and a gate electrode connected to the emission control line EMLj.

The fifth transistor T5 and the sixth transistor T6 are simultaneously turned on according to the emission control signal EMj transmitted through the emission control line EMLj. The first driving voltage ELVDD applied through the turned-on fifth transistor T5 may be compensated through the diode-connected first transistor T1 and then transmitted to the light emitting element ED.

The seventh transistor T7 includes a first electrode connected to the second electrode of the sixth transistor T6, a second electrode connected to the fourth driving voltage line VL4 to which the second initialization voltage AINT is transmitted, and a gate electrode connected to the second write scan line SWLj+1.

As described above, one end of the capacitor Cst is connected to the gate electrode of the first transistor T1 and the other end of the capacitor Cst is connected to the first driving voltage line VL1. The cathode of the light emitting element ED may be connected to the second driving voltage line VL2 transmitting the second driving voltage ELVSS.

The display panel 100 may display an image for a plurality of frames F1 (see FIG. 5B). When the high level initialization scan signal SIj is provided through the initialization scan line SILj during an initialization section PP1 of each the frames F1, the fourth transistor T4 is turned on in response to the high level initialization scan signal SIj. The first initialization voltage VINT is transferred to the gate electrode of the first transistor T1 through the turned-on fourth transistor T4, and the gate electrode of the first transistor T1 is initialized by the first initialization voltage VINT.

Next, when the high level compensation scan signal SCj is supplied through the compensation scan line SCLj during a compensation section PP2 of the frame F1, the third transistor T3 is turned on. The compensation section PP2 may not overlap the initialization section PP1. For example, the compensation section PP2 may occur after the initialization section PP1. During the compensation section PP2, the first transistor T1 is diode-connected by the turned-on third transistor T3 and is forward biased.

As an example of the inventive concept, an activation section of the compensation scan signal SCj (in other words, corresponding to the compensation section PP2) is a section in which the compensation scan signal SCj has a high level, and an activation section of the initialization scan signal SIj (in other words, corresponding to the initialization section PP2) is a section in which the initialization scan signal SIj has a high level. The activation section of the initialization scan signal SIj may precede the activation section of the compensation scan signal SCj. When the third and fourth transistors T3 and T4 are P-type transistors, the activation section of the compensation scan signal SCj (in other words, corresponding to the compensation section PP2) is a section in which the compensation scan signal SCj has a low level, and the activation section of the initialization scan signal SIj (in other words, corresponding to the initialization section PP1) may be a section in which the initialization scan signal SIj has a low level.

The compensation section PP2 may include a data writing section PP3 in which the first write scan signal SWj is generated at a low level. During the data writing section PP3, the second transistor T2 is turned on by the low level first write scan signal SWj. Then, the compensation voltage "Di-Vth" reduced by the threshold voltage Vth of the first transistor T1 from the data signal Di supplied from the data wire DLi is applied to the gate electrode of the first transistor T1. In other words, the potential of the gate electrode of the first transistor T1 may be the compensation voltage "Di-Vth".

The first driving voltage ELVDD and the compensation voltage "Di-Vth" are applied to both ends of the capacitor Cst, and a charge corresponding to a voltage difference between both ends of the capacitor Cst may be stored in the capacitor Cst.

The seventh transistor T7 is turned on by receiving the low level second write scan signal SWLj+1 through the second write scan line SWLj+1 during an anode initialization section PP4. A portion of the driving current Id may escape through the seventh transistor T7 as the bypass current Ibp.

When the pixel PXij displays a black image, even if the minimum driving current of the first transistor T1 flows as the driving current Id, if the light emitting element ED emits light, the pixel PXij may not normally display a black image. In other words, the pixel PXij may not display a completely black image. Accordingly, the seventh transistor T7 in the pixel PXij according to an embodiment of the inventive concept may distribute a portion of the minimum driving current of the first transistor T1 as the bypass current Ibp to a current path other than the current path toward the light emitting element ED. Here, the minimum driving current of the first transistor T1 is a current flowing through the first transistor T1 when the gate-source voltage Vgs of the first transistor T1 is less than the threshold voltage Vth, so that the first transistor T1 is turned off. When the first transistor T1 is turned off this way, a minimum driving current (e.g., a current of 10 pA or less) flowing through the first transistor T1 is transmitted to the light emitting element ED to display a black gradation image. When the pixel PXij displays a black image, while the effect of the bypass current Ibp on the minimum drive current is relatively large, in the case of displaying an image such as a normal image or a white image, the bypass current Ibp has little effect on the driving current Id. Therefore, when displaying a black image, a current (e.g., the light emitting current Ied) reduced by the amount of the bypass current Ibp escaping from the driving current Id through the seventh transistor T7 is provided to the light emitting element ED, so black images may be clearly expressed. Accordingly, the pixel PXij may implement an accurate black gradation image by using the seventh transistor T7, and as a result, the contrast ratio may be improved.

Next, the emission control signal EMj supplied from the emission control line EMLj is changed from a high level to a low level. The fifth transistor T5 and the sixth transistor T6 are turned on by the low-level emission control signal EMj. Then, the driving current Id is generated according to a voltage difference between the gate voltage of the gate electrode of the first transistor T1 and the first driving voltage ELVDD, and the driving current Id is supplied to the light emitting element ED through the sixth transistor T6 so that the light emitting current Ied flows through the light emitting element ED.

The input sensor 200 may include a plurality of transmission electrodes TE1 to TEk (or first detection electrodes) and a plurality of reception electrodes RE1 to REj (or second detection electrodes). The plurality of transmission electrodes TE1 to TEk may extend along the second direction DR2 and may be arranged in the first direction DR1. As an example of the inventive concept, the transmission electrodes TE1 to TEk may extend along the data wires DL1 to DLm. The plurality of reception electrodes RE1 to REj may extend along the first direction DR1 and may be arranged in the second direction DR2. The plurality of transmission electrodes TE1 to TEk may cross the plurality of reception electrodes RE1 to REj. A capacitance may be formed between the plurality of transmission electrodes TE1 to TEk and the plurality of reception electrodes RE1 to REj. The number of the transmission electrodes TE1 to TEk and the reception electrodes RE1 to REj is not particularly limited.

The input sensor 200 may further include a plurality of first signal wires connected to the plurality of transmission electrodes TE1 to TEk and a plurality of second signal wires connected to the plurality of reception electrodes RE1 to REj.

Figure 6A:
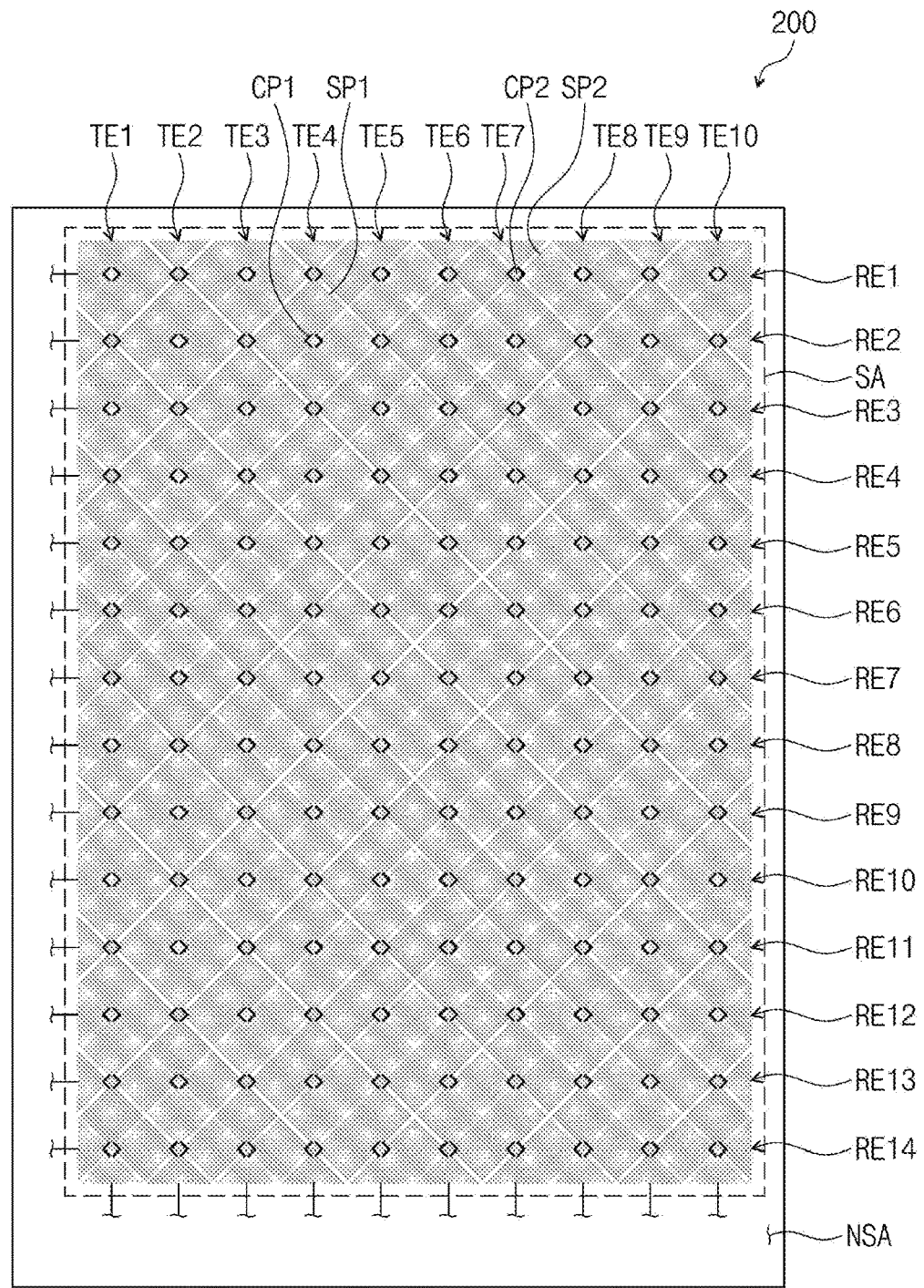
FIG. 6A is a plan view of an input sensor according to an embodiment of the inventive concept.
Figure 6B:
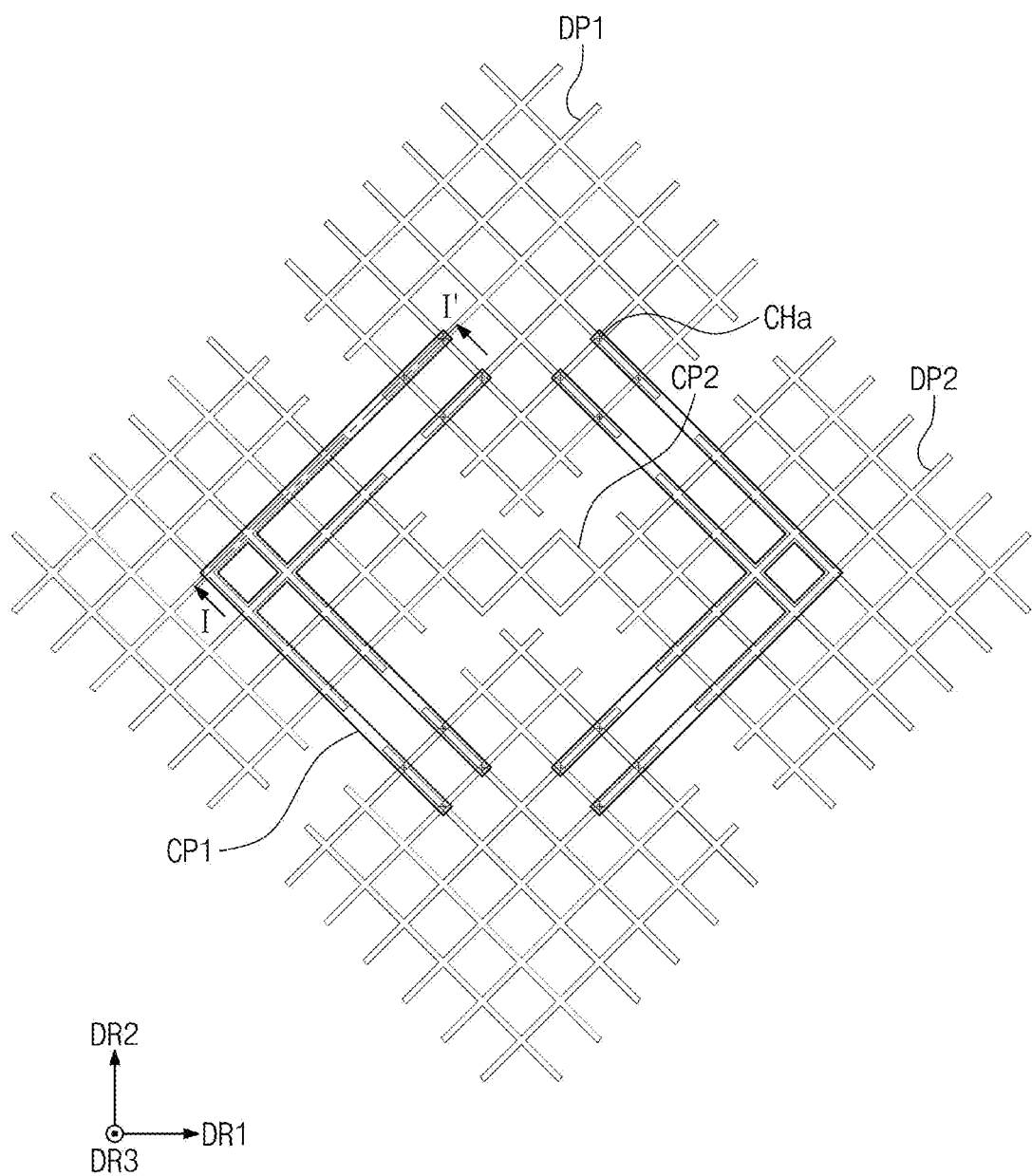
FIG. 6B is an enlarged plan view of a portion of the input sensor illustrated in FIG. 6A.
Figure 6C:
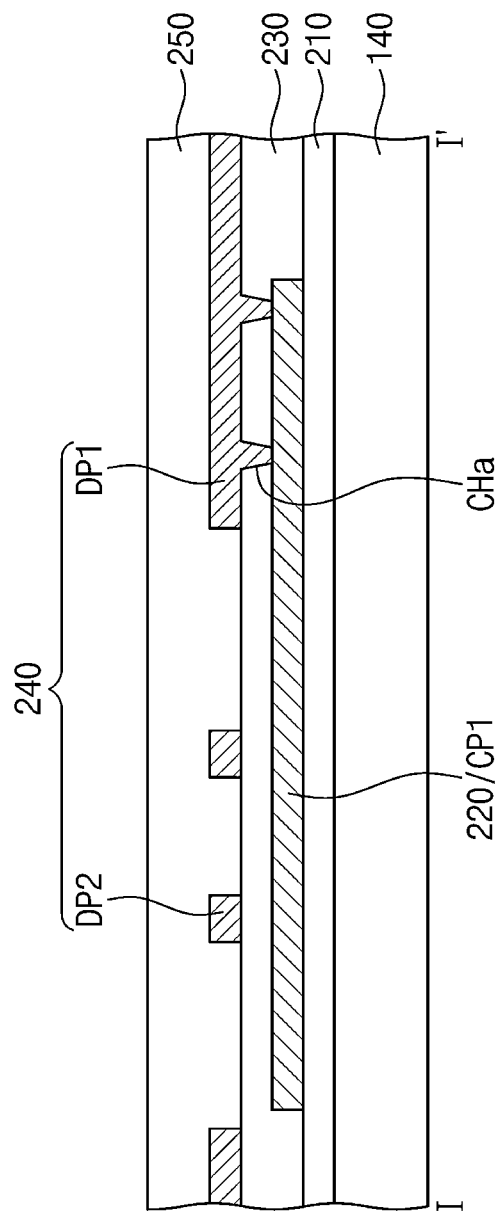
FIG. 6C is a cross-sectional view taken along the cutting line I-I' shown in FIG. 6B.

FIG. 6A is a plan view of the input sensor according to an embodiment of the inventive concept, FIG. 6B is an enlarged plan view of a portion of the input sensor shown in FIG. 6A, and FIG. 6C is a cross-sectional view taken along the cutting line I-I' shown in FIG. 6B.

Referring to FIGS. 6A to 6C, the input sensor 200 includes a sensing area SA and a non-sensing area NSA. The sensing area SA may correspond to the active area AA shown in FIG. 1, and the non-sensing area NSA may correspond to the peripheral area NAA shown in FIG. 1. A plurality of transmission electrodes TE1, TE2, TE3, TE4, TE5, TE6, TE7, TE8, TE9 and TE10 and a plurality of reception electrodes RE1, RE2, RE3, RE4, RE5, RE6, RE7, RE8, RE9, RE10, RE11, RE12, RE13 and RE14 are disposed in the sensing area SA, and may sense an input.

Each of the plurality of transmission electrodes TE1 to TE10 may include a first detection portion DP1 and a connection portion CP1. The first detection portion DP1 and the connection portion CP1 may have an integral shape and may be disposed on the same layer. For example, the first detection portion DP1 and the connection portion CP1 may be included in the second conductive layer 240. Alternatively, the first detection portion DP1 and the connection portion CP1 may be included in the first conductive layer 220.

Each of the plurality of reception electrodes RE1 to RE14 may include a second detection portion DP2 and a bridge portion CP2. The two second detection portions DP2 adjacent to each other may be electrically connected to each other by the bridge portion CP2, but they are not particularly limited thereto. The second detection portion DP2 and the bridge portion CP2 may be disposed on different layers. For example, the second detection portion SP2 may be included in the second conductive layer 240, and the bridge portion CP2 may be included in the first conductive layer 220.

The detection insulating layer 230 is disposed between the first detection portion DP1 and the connection portion CP1, and the first detection portion DP1 and the connection portion CP1 may be electrically connected through a contact hole CHa in the detection insulating layer 230.

The bridge portion CP2 may cross insulated from the connection portion CP1. When the first and second detection portions DP1 and DP2 and the connection portion CP1 are included in the second conductive layer 240, the bridge portion CP2 may be included in the first conductive layer 220. Alternatively, when the first and second detection portions DP1 and DP2 and the connection portion CP1 are included in the first conductive layer 220, the bridge portion CP2 may be included in the second conductive layer 240.

Each of the plurality of transmission electrodes TE1 to TE10 may have a mesh shape, and each of the plurality of reception electrodes RE1 to RE14 may have a mesh shape.

The first and second detection portions DP1 and DP2, the connection portion CP1, and the bridge portion CP2 may include a metal layer. Each of the first and second detection portions DP1 and DP2, the connection portion CP1, and the bridge portion CP2 may have a mesh shape. Accordingly, opening parts (e.g., touch opening parts) formed by mesh lines may be formed in each of the first and second detection portions DP1 and DP2. As an example of the inventive concept, each of the opening parts may have a rhombus shape.

In a plan view, the plurality of light emitting elements ED (see FIG. 3) may be respectively disposed within the touch opening parts. Accordingly, light generated by each light emitting element ED may be emitted normally without being affected by the first and second detection portions DP1 and DP2.

Referring back to FIG. 4, the display device 1000 may include a signal control circuit 100C1, a scan driving circuit 100C2, a data driving circuit 100C3, and a selection circuit 100C4.

Figure 7:
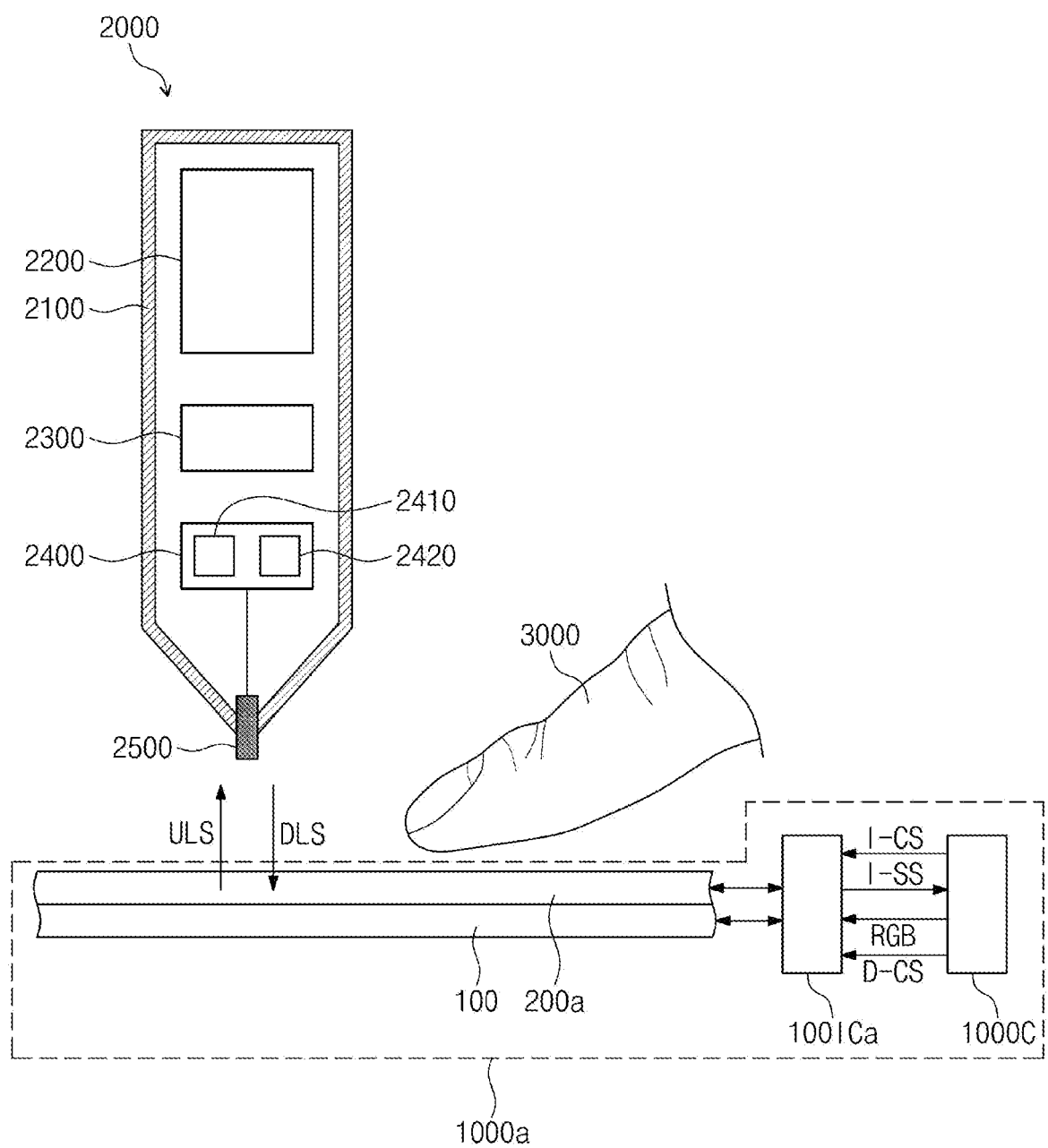
FIG. 7 is a block diagram illustrating a display device and an input device according to an embodiment of the inventive concept.

The signal control circuit 100C1 may receive the image signal RGB and the display control signal D-CS from a main controller 1000C (refer to FIG. 7). The display control signal D-CS may include various control signals. For example, the display control signal D-CS may include a vertical synchronization signal, a horizontal synchronization signal, a main clock, and a data enable signal.

The signal control circuit 100C may generate a scan control signal SCS based on the display control signal D-CS and output the scan control signal SCS to the scan driving circuit 100C2. The scan control signal SCS may include a vertical start signal and a clock signal. The signal control circuit 100C1 may generate a data control signal DCS based on the display control signal D-CS and output the data control signal DCS to the data driving circuit 100C3. The data control signal DCS may include a horizontal start signal and an output enable signal.

In addition, the signal control circuit 100C1 may process the image signal RGB according to the operating conditions of the display panel 100 to generate image data DAT, and output the generated image data DAT to the data driving circuit 100C3. The scan control signal SCS and the data control signal DCS are signals necessary for the operation of the scan driving circuit 100C2 and the data driving circuit 100C3, and are not particularly limited thereto.

The scan driving circuit 100C2 may sequentially apply the scan signal to the plurality of scan wires SL1 to SLn in response to the scan control signal SCS. In an embodiment of the inventive concept, the scan driving circuit 100C2 may be directly formed on the display panel 100 through the same process as the circuit layer 120 in the display panel 100 (refer to FIG. 3), but it is not limited thereto. Optionally, the scan driving circuit 100C2 is implemented as an integrated circuit (IC) and is directly mounted on a predetermined area of the display panel 100 or mounted on a separate printed circuit board in a chip on film (COF) method to be electrically connected to the display panel 100.

The data driving circuit 100C3 may convert the image data DAT into data signals in response to the data control signal DCS from the signal control circuit 100C1. The converted data signals may be provided to the selection circuit 100C4. The selection circuit 100C4 may electrically connect the data driving circuit 100C3 to any one of the display panel 100 and the input sensor 200.

The display device 1000 may further include a sensor control circuit 200C1 and an input detection circuit 200C2.

The sensor control circuit 200C1 may receive a detection control signal I-CS from the main controller 1000C. The sensor control circuit 200C1 may provide detection driving data I-DAT to the data driving circuit 100C3 based on the detection control signal I-CS. The data driving circuit 100C3 may convert the detection driving data I-DAT into detection driving signals and output the converted detection driving signals to the selection circuit 100C4.

The selection circuit 100C4 receives data signals or detection driving signals from the data driving circuit 100C3. The selection circuit 100C4 may output data signals to the display panel 100, in other words, the data wires DL1 to DLm in response to first and second enable signals ENb and EN, or output detection driving signals to the input sensor 200, in other words, the transmission electrodes TE1 to TEk.

The input detection circuit 200C2 may receive detection signals from the reception electrodes RE1 to REj of the input sensor 200. The input detection circuit 200C2 may convert an analog signal into a digital signal. For example, the input detection circuit 200C2 may amplify and then filter the received analog detection signals, and convert the filtered signal into a digital signal.

The sensor control circuit 200C1 may generate a coordinate signal I-SS based on the digital signal received from the input detection circuit 200C2. For example, when detecting an external input (e.g., a touch input) by a user's finger, the sensor control circuit 200C1 may generate a coordinate signal I-SS including information on the coordinates to which the touch input is provided by using the digital signal.

As an example of the inventive concept, the signal control circuit 100C1, the sensor control circuit 200C1, the data driving circuit 100C3, the selection circuit 100C4, and the input detection circuit 200C2 may be implemented as one driving integrated circuit 100IC. However, the embodiment of the inventive concept is not limited thereto. The data driving circuit 100C3 and the selection circuit 100C4 may be implemented as one driving integrated circuit 100IC. Alternatively, the selection circuit 100C4 may be directly formed on the display panel 100 through the same process as the circuit layer 120 in the display panel 100.

FIG. 7 is a block diagram illustrating a display device and an input device according to an embodiment of the inventive concept.

Referring to FIG. 7, in the display device 1000a according to an embodiment of the inventive concept, an input sensor 200a may be disposed on the display panel 100. The input sensor 200a may detect an external input applied from the outside. The input sensor 200a may detect a first input by a user's body 3000 and a second input by the input device 2000. Hereinafter, a mode in which the input sensor 200a detects a first input by the user's body 3000 is referred to as a first detection mode, and a mode in which the second input by the input device 2000 is sensed is referred to as a second sensing mode.

The input device 2000 may include a housing 2100, a power source 2200, a pen controller 2300, a communication module (or communication circuit) 2400, and a tip electrode (or pen electrode) 2500. However, the components constituting the input device 2000 are not limited to the components listed above. For example, the input device 2000 may further include an electrode switch for switching to a signal transmission mode or a signal reception mode, a pressure sensor for detecting pressure, a memory for storing predetermined information, or a rotation sensor for detecting rotation.

The housing 2100 may have a pen shape, and an accommodation space may be formed therein. The power source 2200, the pen controller 2300, the communication module 2400, and the tip electrode 2500 may be accommodated in the accommodation space inside the housing 2100.

The power source 2200 may supply power to the pen controller 2300 and the communication module 2400 inside the input device 2000. The power source 2200 may include a battery or a high capacity capacitor.

The pen controller 2300 may control the operation of the input device 2000. The pen controller 2300 may be an application-specific integrated circuit (ASIC). The pen controller 2300 may be configured to operate according to a designed program.

The communication module 2400 may include a transmission circuit 2410 and a reception circuit 2420. The transmission circuit 2410 may output a downlink signal DLS to the input sensor 200a. The reception circuit 2420 may receive an uplink signal ULS provided from the input sensor 200a. The transmission circuit 2410 may receive the signal provided from the pen controller 2300 and modulate the received signal into a signal that may be sensed by the input sensor 200a, and the reception circuit 2420 may modulate the signal provided from the input sensor 200a into a signal that may be processed by the pen controller 2300.

The tip electrode 2500 is electrically connected to the reception circuit 2420 and the transmission circuit 2410. A portion of the tip electrode 2500 may protrude from the housing 2100. In addition, the input device 2000 may further include a cover housing that covers the pen electrode 2500 exposed from the housing 2100. Optionally, the pen electrode 2500 may be embedded in the housing 2100. The communication module 2400 may receive an uplink signal ULS or transmit a downlink signal DLS through the tip electrode 2500.

The main controller 1000C may control the overall operation of the display device 1000a. For example, the main controller 1000C may control the operation of a driving integrated circuit 100ICa. The main controller 1000C may include at least one microprocessor, and the main controller 1000C may be referred to as a host.

The driving integrated circuit 100ICa may control operations of the display panel 100 and the input sensor 200a. The driving integrated circuit 100ICa may have a configuration substantially similar to that of the driving integrated circuit 100IC illustrated in FIG. 4. However, unlike the driving integrated circuit 100IC shown in FIG. 4, the driving integrated circuit 100ICa may control a signal provided to the input sensor 200a according to the detection mode of the input sensor 200a.

When the input sensor 200a is used as a medium for communication with the input device 2000 as shown in FIG. 7, the data driving circuit 100C3 (refer to FIG. 4) may further generate an uplink signal ULS. In other words, in the first detection mode, the data driving circuit 100C3 may output a detection driving signal, and in the second detection mode, the data driving circuit 100C3 may output the uplink signal ULS. In addition, the selection circuit 100C4 (see FIG. 4) may output the detection driving signal to the input sensor 200a in the first detection mode, but output the uplink signal ULS to the input sensor 200a in the second detection mode.

Figure 8:
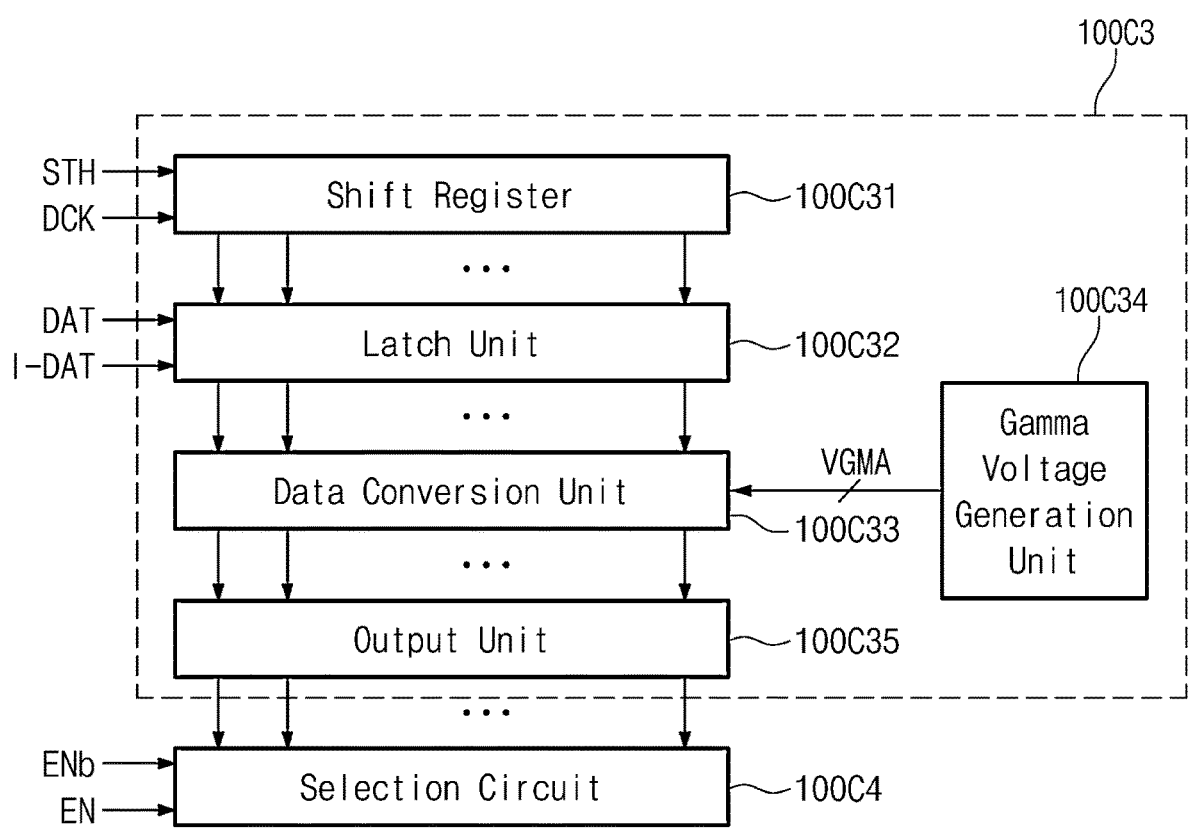
FIG. 8 is a block diagram illustrating a data driving circuit and a selection circuit according to an embodiment of the inventive concept.

FIG. 8 is a block diagram illustrating a data driving circuit and a selection circuit according to an embodiment of the inventive concept.

Referring to FIG. 8, the data driving circuit 100C3 includes a shift register 100C31, a latch unit (or a latch circuit) 100C32, a data conversion unit (or a data conversion circuit) 100C33, a gamma voltage generation unit (or a gamma voltage generation circuit) 100C34, and an output unit (or an output circuit) 100C35. Each of the shift register 100C31, the latch unit 100C32, the data conversion unit 100C33, the gamma voltage generation unit 100C34, and the output unit 100C35 may be implemented in hardware as a circuit.

The shift register 100C31 sequentially activates a plurality of latch clock signals based on a horizontal start signal STH and a data clock signal DCK. The horizontal start signal STH and the data clock signal DCK may be signals included in the data control signal DCS (shown in FIG. 4) provided from the signal control circuit 100C1 (shown in FIG. 4).

The latch unit 100C32 latches the image data DAT in response to latch clock signals provided from the shift register 100C31. According to an embodiment of the inventive concept, the latch unit 100C32 may simultaneously output the latched image data DAT to the data conversion unit 100C33 based on the data load signal or may provide the latched image data DAT with a predetermined time difference. The data load signal may be a signal included in the data control signal DCS. According to an embodiment of the inventive concept, the latched image data DAT includes digital signals.

The data conversion unit 100C33 receives the image data DAT from the latch unit 100C32. The data conversion unit 100C33 converts the received image data DAT into analog data signals. The data conversion unit 100C33 may receive a plurality of gamma voltages VGMA from the gamma voltage generation unit 100C34. The data conversion unit 100C33 may convert the image data DAT into an analog form based on the gamma voltages VGMA.

The data conversion unit 100C33 receives detection driving data I-DAT from the latch unit 100C32. The data conversion unit 100C33 converts the received detection driving data I-DAT into analog type detection driving signals. The data conversion unit 100C33 may receive a plurality of gamma voltages VGMA from the gamma voltage generation unit 100C34. The data conversion unit 100C33 may convert the detection driving data I-DAT into an analog form based on the gamma voltages VGMA.

Data signals or detection driving signals generated from the data conversion unit 100C33 are provided to the output unit 100C35. The output unit 100C35 may provide data signals or detection driving signals to the selection circuit 100C4.

The selection circuit 100C4 receives data signals or detection driving signals from the output unit 100C35. The selection circuit 100C4 may output data signals to the display panel 100, in other words, the data wires DL1 to DLm in response to the first and second enable signals ENb and EN, or output detection driving signals to the input sensor 200 (e.g., the transmission electrodes TE1 to TEk).

Alternatively, the data conversion unit 100C33 may further receive external sensing data for sensing an input of the input device 2000 (refer to FIG. 7) (or an external device). The data conversion unit 100C33 may output external detection data in analog form as external detection signals (e.g., the uplink signal ULS (see FIG. 7), etc.). In addition, the data conversion unit 100C33 may receive a plurality of gamma voltages VGMA from the gamma voltage generation unit 100C34. The data conversion unit 100C33 may convert the external sensing data into an analog form based on the gamma voltages VGMA.

Data signals generated from the data conversion unit 100C33, detection driving signals, or external detection signals are provided to the output unit 100C35. The output unit 100C35 may provide data signals, detection driving signals, or external detection signals to the selection circuit 100C4. The selection circuit 100C4 may select and output one of data signals, detection driving signals, or external detection signals.

Figure 9A:
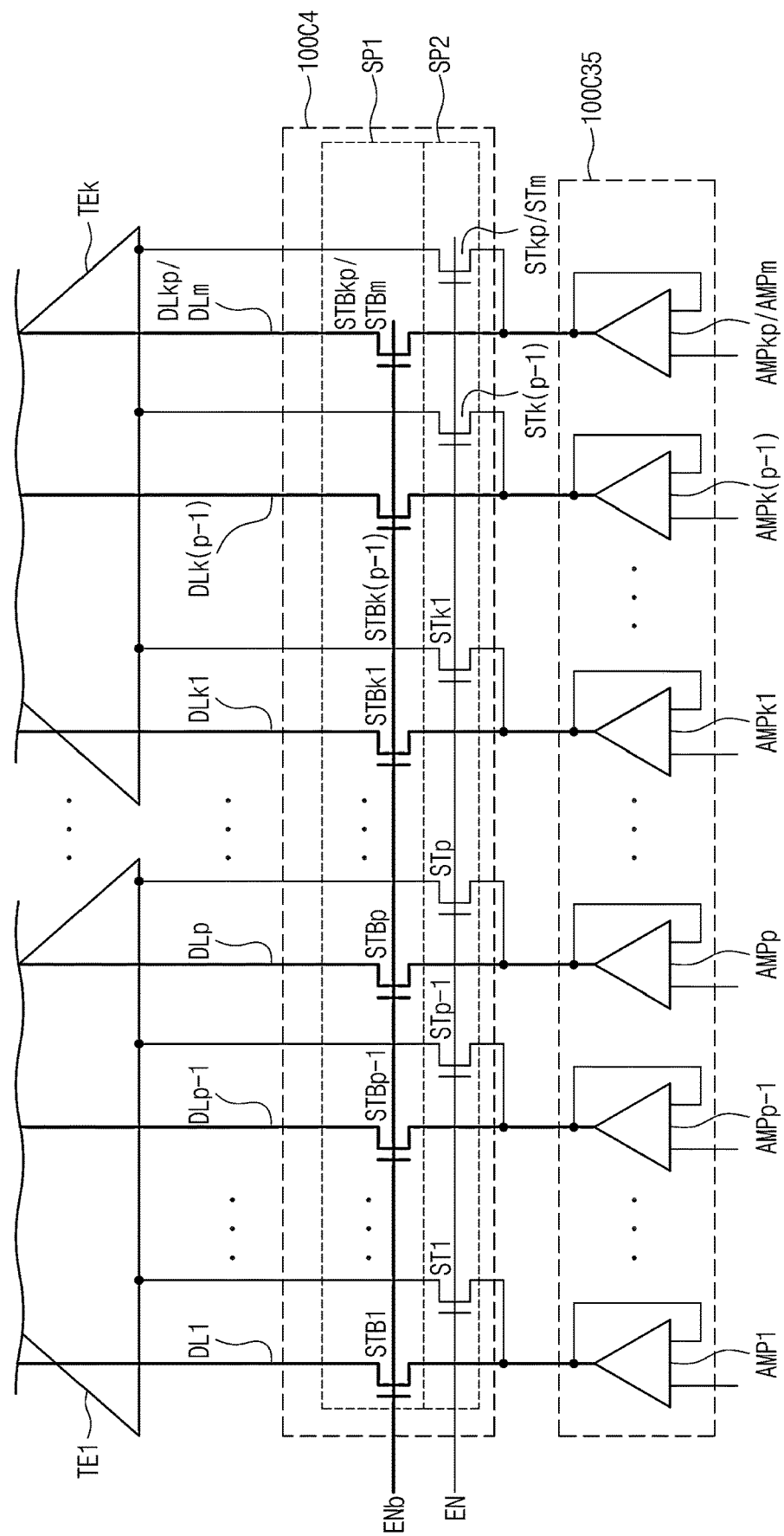
FIGS. 9A and 9B are circuit diagrams for explaining the operation of a selection circuit according to an embodiment of the inventive concept.
Figure 9B:
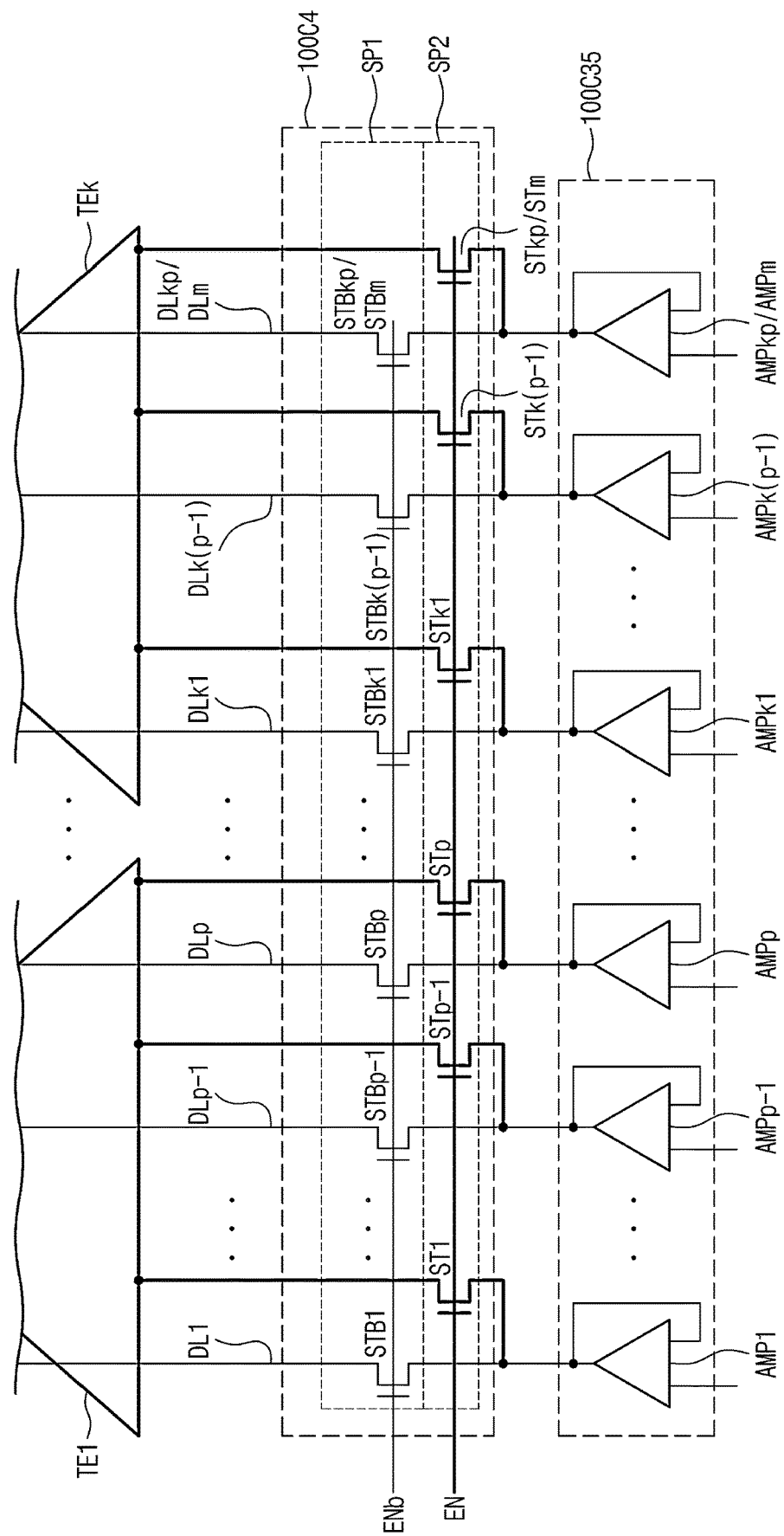

FIGS. 9A and 9B are circuit diagrams for explaining the operation of a selection circuit according to an embodiment of the inventive concept. FIG. 9A shows a state in which a first switching unit (or a first switching circuit) SP1 of the selection circuit 100C4 is turned on, and FIG. 9B shows a state in which a second switching unit (or second switching circuit) SP2 of the selection circuit 100C4 is turned on.

Referring to FIGS. 9A and 9B, the output unit 100C35 may include a plurality of output buffers AMP1 to AMPm. The number of output buffers AMP1 to AMPm may be set according to the number of data wires DL1 to DLm disposed on the display panel 100 (refer to FIG. 4). As an example of the inventive concept, the number of output buffers AMP1 to AMPm may correspond to (or equal to) the number of data wires DL1 to DLm.

The selection circuit 100C4 may include the first switching unit SP1 and the second switching unit SP2. The first switching unit SP1 is connected between the output unit 100C35 and the display panel 100 (in particular, the data wires DL1 to DLm), and the second switching unit SP2 is connected between the output unit 100C35 and the input sensor 200 (in particular, the transmission electrodes TE1 to TEk). The first switching unit SP1 receives the first enable signal ENb from the signal control circuit 100C1, and electrically connects the output unit 100C35 and the data wires DL1 to DLm in response to the first enable signal ENb. The second switching unit SP2 receives the second enable signal EN from the signal control circuit 100C1 and electrically connects the output unit 100C35 and the transmission electrodes TE1 to TEk in response to the second enable signal EN.

The first switching unit SP1 includes a plurality of first switching elements STB1 to STBm connected to the plurality of output buffers AMP1 to AMPm, and the second switching unit SP2 includes a plurality of second switching elements ST1 to STm connected to the plurality of output buffers AMP1 to AMPm. As an example of the inventive concept, the plurality of first switching elements STB1 to STBm are connected to the plurality of output buffers AMP1 to AMPm in a one-to-one correspondence, and the plurality of second switching elements ST1 to STm are connected to the plurality of output buffers AMP1 to AMPm in a one-to-one correspondence.

Each of the plurality of first switching elements STB1 to STBm includes a gate electrode connected between an output terminal of the corresponding output buffer and the corresponding data wire and receiving the first enable signal ENb. In other words, the gate electrode of each of the plurality of first switching elements STB1 to STBm is provided with the first enable signal ENb. Accordingly, each of the plurality of first switching elements STB1 to STBm may transmit the corresponding data signal output from the corresponding output buffer to the corresponding data wire in response to the first enable signal ENb.

Each of the plurality of second switching elements ST1 to STm includes a gate electrode connected between an output terminal of a corresponding output buffer and a corresponding transmission electrode and receiving the second enable signal EN. In other words, the gate electrode of each of the plurality of second switching elements ST1 to STm is provided with the second enable signal EN. Accordingly, each of the plurality of second switching elements ST1 to STm may transmit the corresponding detection driving signal output from the corresponding output buffer to the corresponding transmission electrode in response to the second enable signal EN.

As an example of the inventive concept, each of the transmission electrodes TE1 to TEk may overlap p number of data wires. Here, when m is the total number of data wires and k is the total number of transmission electrodes, p may be an integer greater than 1 and less than m. As an example of the inventive concept, m may be a number corresponding to a product of p and k.

The first transmission electrode TE1 may overlap p data wires DL1 to DLp−1 and DLp, and the k-th transmission electrode TEk may overlap p data wires DLk1 to DLk(p−1) and DLkp. In this case, each of the transmission electrodes TE1 to TEk may receive a detection driving signal from corresponding p second switching elements among the plurality of second switching elements ST1 to STm. For example, the first transmission electrode TE1 may receive a detection driving signal from p second switching elements STB1 to STBp−1 and STBp, and the k-th transmission electrode TEk may receive a detection driving signal from p second switching elements STBk1 to STBk(p−1) and STBkp.

As described above, when the transmission electrodes TE1 to TEk respectively overlap the p number of data wires, each of the transmission electrodes TE1 to TEk may receive a detection driving signal from the p number of output buffers. However, the embodiment of the inventive concept is not limited thereto. For example, when the transmission electrodes TE1 to TEk respectively overlap p data wires, each of the transmission electrodes TE1 to TEk may receive a detection driving signal from a smaller number of output buffers than p. However, as the number of output buffers connected to each of the transmission electrodes TE1 to TEk increases, a voltage drop (e.g., a IR drop) of detection driving signals may be improved, and as a result, sensing performance may be improved.

Figure 10:
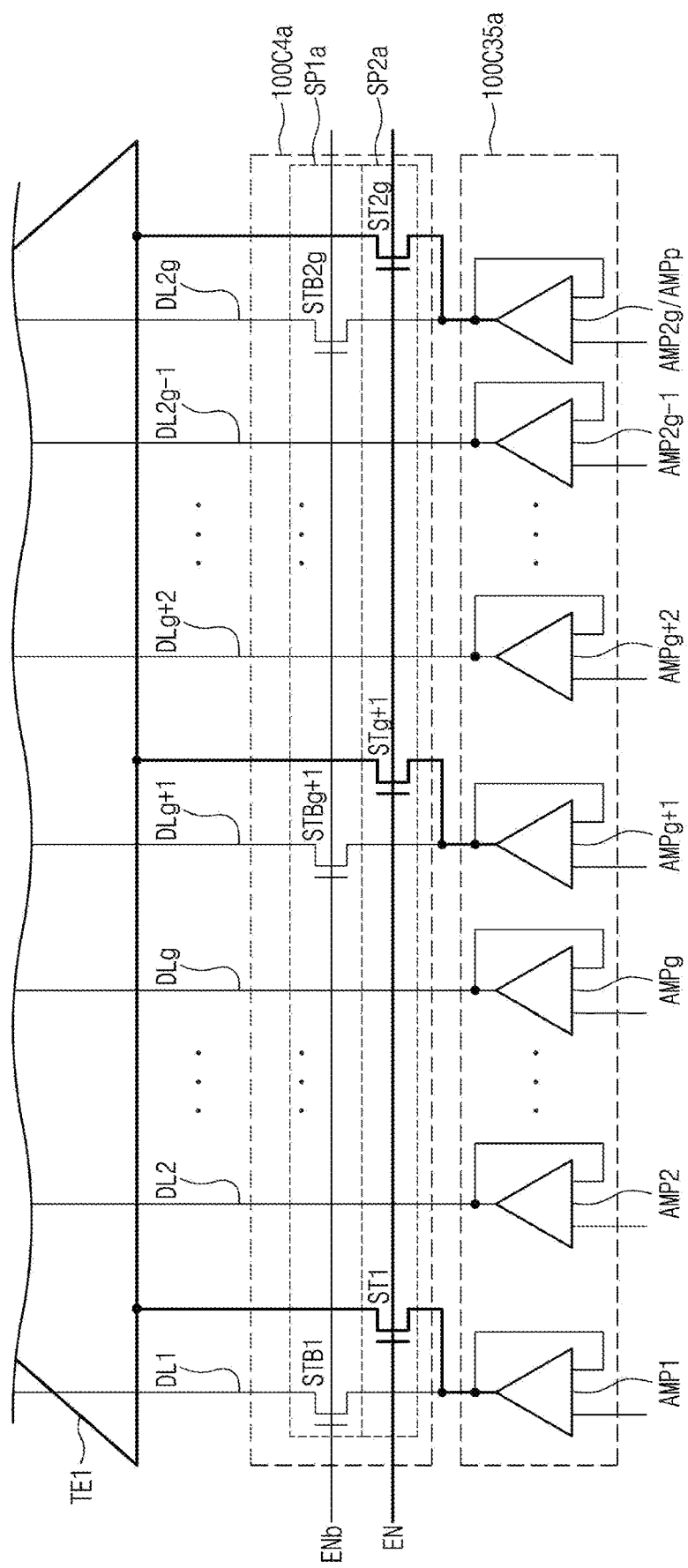
FIG. 10 is a circuit diagram illustrating a selection circuit according to an embodiment of the inventive concept.

FIG. 10 is a circuit diagram illustrating a selection circuit according to an embodiment of the inventive concept.

Referring to FIG. 10, the selection circuit 100C4a may include a first switching unit SP1a and a second switching unit SP2a. The first switching unit SP1a is connected between an output unit 100C35a and the display panel 100, and the second switching unit SP2a is connected between the output unit 100C35a and the input sensor 200 (particularly, the transmission electrodes TE1 to TEk). The first switching unit SP1a electrically connects the output unit 100C35a and some data wires DL1, DLg+1, and DL2g of the data wires DL1 to DLm in response to the first enable signal ENb. The second switching unit SP2a receives the second enable signal EN from the signal control circuit 100C1 and electrically connects the output unit 100C35 and the transmission electrodes TE1 to TEk in response to the second enable signal EN.

The first switching unit SP1a includes a plurality of first switching elements STB1, STBg+1, and STB2g connected to some output buffers AMP1, AMPg+1, and AMP2g among the plurality of output buffers AMP1 to AMPp. The second switching unit SP2a includes a plurality of second switching elements ST1, STg+1, and ST2g connected to the some output buffers AMP1, AMPg+1, and AMP2g among the plurality of output buffers AMP1 to AMPp. In other words, the number of the first switching elements STB1, STBg+1, STB2g included in the first switching unit SP1a may be smaller than the total number of the output buffers AMP1 to AMPp, and the number of second switching elements ST1, STg+1 and ST2g included in the second switching unit SP2a may be smaller than the total number of the output buffers AMP1 to AMPp.

Each of the plurality of first switching elements STB1, STBg+1, and STB2g includes a gate electrode connected between an output terminal of the corresponding output buffer and the corresponding data wire and receiving the first enable signal ENb. Accordingly, in response to the first enable signal ENb, each of the plurality of first switching elements STB1, STBg+1, and STB2g may transmit the corresponding data signal output from the corresponding output buffer to the corresponding data wire.

Each of the plurality of second switching elements ST1, STg+1, and ST2g includes a gate electrode connected between an output terminal of a corresponding output buffer and a corresponding transmission electrode and receiving the second enable signal EN. Accordingly, in response to the second enable signal EN, each of the plurality of second switching elements ST1, STg+1, and ST2g may transmit the corresponding detection driving signal output from the corresponding output buffer to the corresponding transmission electrode.

However, the output buffers AMP2 to AMPg and AMPg+2 to AMP2g-1 that are not electrically connected to the first and second switching units SP1a and SP2a may be directly connected to the corresponding data wires DL2 to DLg and DLg+2 to DL2g-1 without passing through the selection circuit 100C4a. In other words, output buffer AMP2 is directly connected to data wire DL2 and output buffer AMPg is directly connected to data wire DLg.

As an example of the inventive concept, the first transmission electrode TE1 may overlap 2g data wires DL1 to DL2g. Here, g may be an integer of 2 or more. In this case, the first transmission electrodes TE1 may receive a corresponding detection driving signal from the second switching elements ST1, STg+1, and ST2g (e.g., three switch switching elements) with a number of less than 2g.

The output buffers AMP1, AMPg+1, and AMP2g electrically connected to the first and second switching units SP1a and SP2a may be maintained in a turned-on state during the activation section of the second enable signal EN. On the other hand, the output buffers AMP2 to AMPg and AMPg+2 to AMP2g-1 that are not electrically connected to the first and second switching units SP1a and SP2a may be maintained in a turned-off state during the activation section of the second enable signal EN.

As such, by driving the input sensor 200 using only some output buffers AMP1, AMPg+1, and AMP2g of the output buffers AMP1 to AMPp in the detection mode, power consumed by the data driving circuit 100C3 when the input sensor 200 is driven may be reduced.

Figure 11:
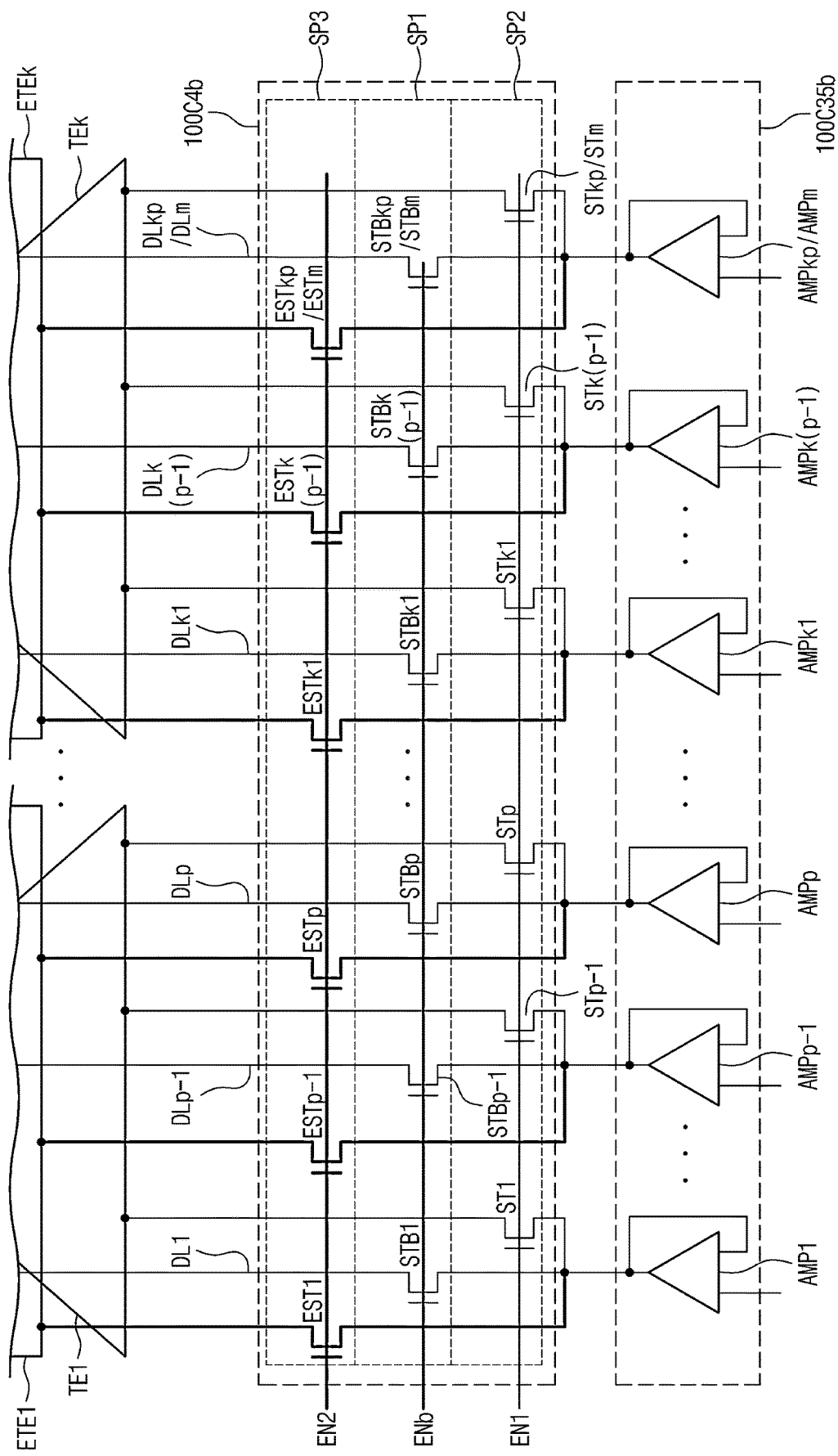
FIG. 11 is a circuit diagram illustrating a selection circuit according to an embodiment of the inventive concept.

FIG. 11 is a circuit diagram illustrating a selection circuit according to an embodiment of the inventive concept.

Referring to FIG. 11, a selection circuit 100C4b may include a first switching unit SP1, a second switching unit SP2, and a third switching unit SP3. Since the first and second switching units SP1 and SP2 have the same configuration as the first and second switching units SP1 and SP2 illustrated in FIGS. 9A and 9B, a detailed description thereof will be omitted. However, the second switching unit SP2 receives a second enable signal EN1.

The third switching unit SP3 may be disposed between an external detection sensor for sensing an external device and an output unit 100C35b. The external device may be, for example, a stylus pen, an active pen, a touch pen, an electronic pen, an e-pen, a digitizer, and the like, and the external detection sensor may be configured independently from the input sensor 200 provided to detect an input through an external device. The external detection sensor may include external detection electrodes ETE1 to ETEk.

The first switching unit SP1 receives a first enable signal ENb from the signal control circuit 100C1 (see FIG. 4), and electrically connects the output unit 100C35b and the data wires DL1 to DLm in response to the first enable signal ENb. The second switching unit SP2 receives the second enable signal EN1 from the signal control circuit 100C1 and electrically connects the output unit 100C35 and the transmission electrodes TE1 to TEk in response to the second enable signal EN1. The third switching unit SP3 receives a third enable signal EN2 from the signal control circuit 100C1, and electrically connects the output unit 100C35b and the external transmission electrodes ETE1 to ETEk in response to the third enable signal EN2.

When the output unit 100C35b provides external detection signals for detecting an external device to the selection circuit 100C4b, the selection circuit 100C4b may output external detection signals to external transmission electrodes in response to the third enable signal EN2.

The third switching unit SP3 includes a plurality of third switching elements EST1 to ESTm connected to the plurality of output buffers AMP1 to AMPm. As an example of the inventive concept, the plurality of third switching elements EST1 to ESTm are connected to the plurality of output buffers AMP1 to AMPm in a one-to-one correspondence.

Each of the plurality of third switching elements EST1 to ESTm may include a gate electrode connected between an output terminal of the corresponding output buffer and the corresponding external transmission electrode and receiving the third enable signal EN2. The gate electrode of each of the plurality of third switching elements EST1 to ESTm is provided with the third enable signal EN2. Accordingly, in response to the third enable signal EN2, each of the plurality of third switching elements EST1 to ESTm may transmit the corresponding external detection driving signal output from the corresponding output buffer to the corresponding external transmission electrode.

FIG. 11 illustrates a case in which a separate external detection sensor for detecting an external device is disposed and transmitted to the external detection sensor through the selection circuit 100C4b, but the inventive concept is not limited thereto. As shown in FIG. 7, when the input device 2000 is provided as an external device, the display device 1000a may detect a second input by the input device 2000 through the input sensor 200a. In this case, since there is no need to additionally include an external detection sensor in the display device 1000a, the selection circuit 100C4b does not need to additionally include a third switching unit SP3, and may transmit an external detection signal (e.g., the uplink signal ULS (refer to FIG. 7)) to the input sensor 200a and the input device 2000 through the second switching unit SP2.

Figure 12A:
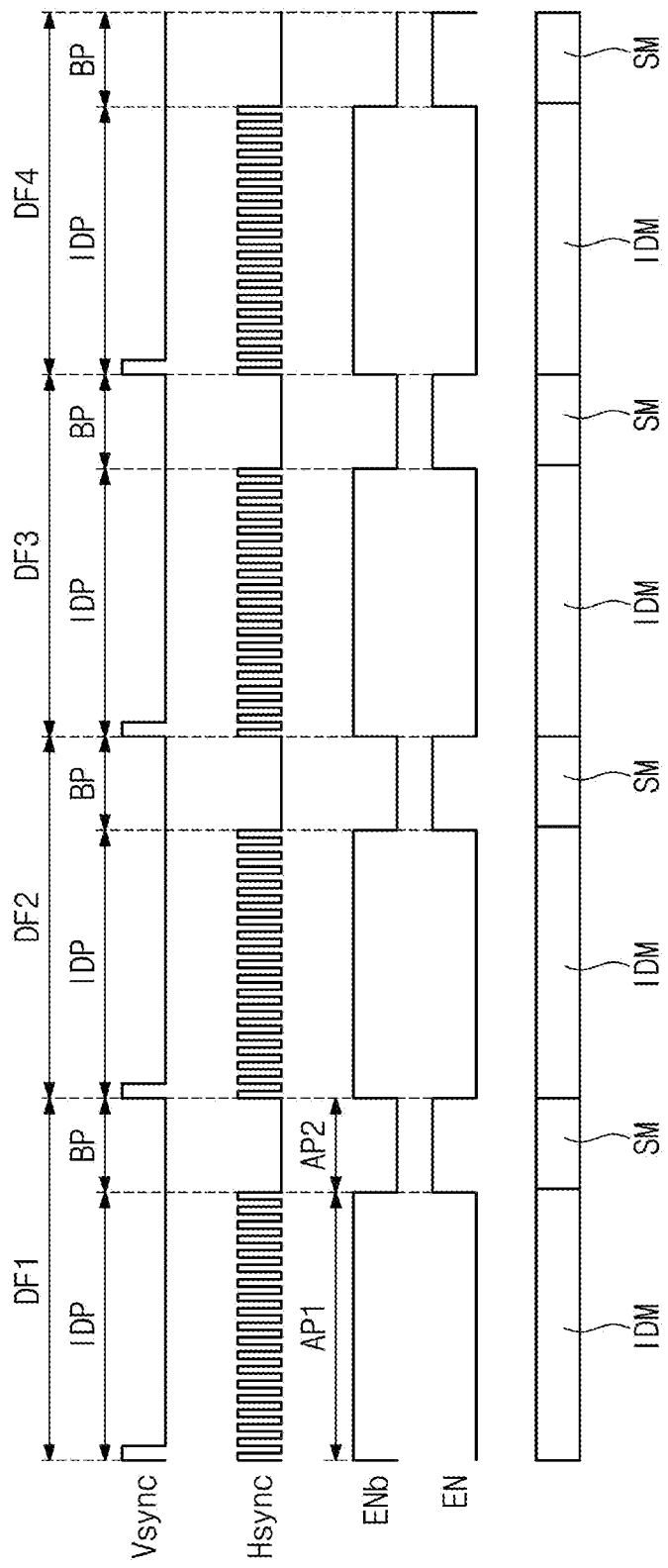
FIGS. 12A, 12B and 12C are waveform diagrams for explaining an operation of a display device according to an embodiment of the inventive concept.
Figure 12B:
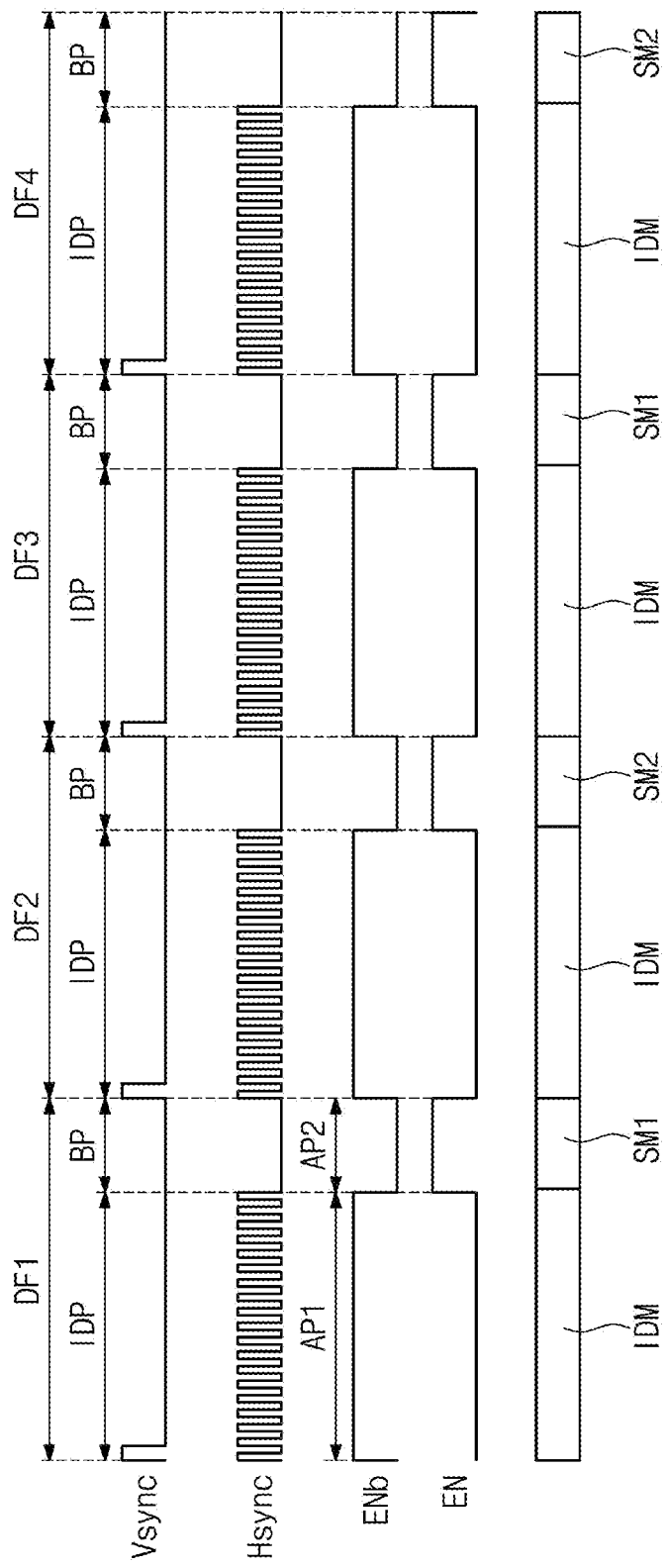
Figure 12C:
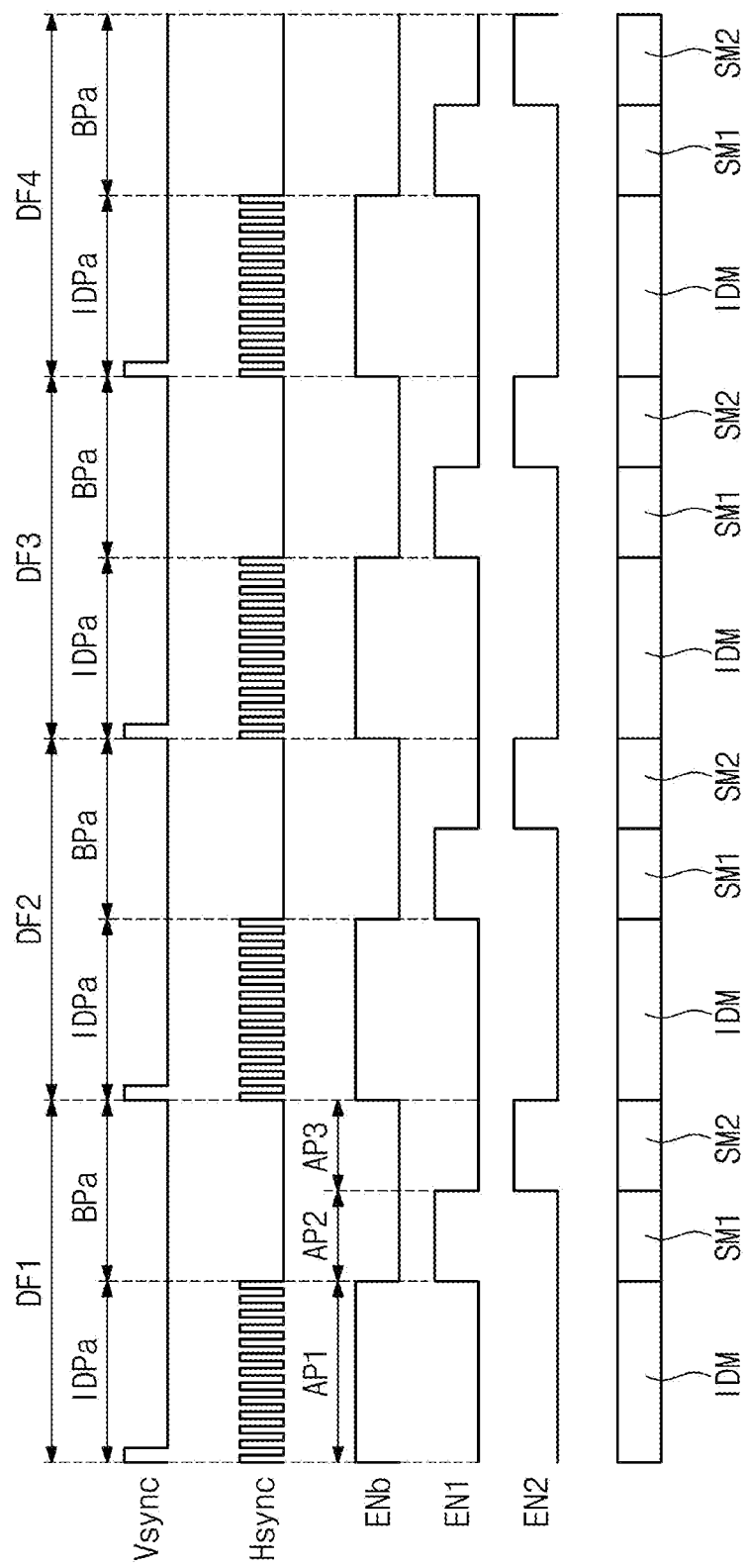

FIGS. 12A to 12C are timing diagrams for explaining an operation of a display device according to an embodiment of the inventive concept.

Referring to FIG. 12A, the display device 1000 (refer to FIG. 4) displays an image through the display panel 100 (refer to FIG. 4). A time unit in which the display panel 100 displays an image may be referred to as a display frame. When the operating frequency of the display panel 100 is 60 Hz, 60 display frames are included in 1 second, and a time corresponding to each display frame may be approximately 16.67 ms. When the operating frequency of the display panel 100 is 120 Hz, 120 display frames are included in 1 second, and a time corresponding to each of the display frames may be approximately 8.3 ms. A period of each of the display frames may be determined by a vertical synchronization signal Vsync. FIGS. 12A to 12C illustrate four display frames (hereinafter, first, second, third and fourth display frames DF1, DF2, DF3 and DF4) among the display frames for convenience of explanation.

Each of the display frames DF1 to DF4 may include an image display section IDP and a blank section BP. The image display section IDP and the blank section BP may be determined by a horizontal synchronization signal Hsync. For example, a section in which the horizontal synchronization signal Hsync is periodically activated in each display frame DF1 to DF4 may be an image display section IDP, and a section in which the horizontal synchronization signal Hsync is maintained in an inactive state may be the blank section BP.

Referring to FIG. 12A, the first enable signal ENb is activated during the image display section IDP and is deactivated during the blank section BP. The first enable signal ENb may have a high level when it is activated and a low level when it is deactivated. Here, the activation section of the first enable signal ENb may be the first section AP1. The second enable signal EN is activated during the blank section BP and deactivated during the image display section IDP. For example, the first enable signal ENb and the second enable signal EN may not be activated at the same time. Here, the activation section of the second enable signal EN may be the second section AP2. As an example of the inventive concept, the duration of the second section AP2 may be the same as the duration of the blank section BP. However, the embodiment of the inventive concept is not limited thereto. For example, the duration of the second section AP2 may be less than or equal to the duration of the blank section BP.

Referring to FIGS. 9A, 9B, and 12A, the first switching unit SP1 is turned on during the first section AP1 so that the display panel 100 may operate in an image display mode IDM for displaying an image. During the first section AP1, the second switching unit SP2 may be maintained in a turned-off state. Thereafter, the second switching unit SP2 is turned on during the second section AP2, so that the input sensor 200 may operate in a detection mode SM for detecting an input. During the second section AP2, the first switching unit SP1 may be maintained in a turned-off state. In the detection mode, the second switching unit SP2 may transmit detection driving signals to the input sensor 200.

Referring to FIGS. 7, 9A, 9B, and 12B, the second switching unit SP2 may transmit different signals to the input sensor 200a (refer to FIG. 7) in units of display frames. For example, in the odd-numbered display frames DF1 and DF3, the input sensor 200a may operate in a first detection mode SM1 for detecting the first input, and in the even-numbered display frames DF2 and DF4, the input sensor 200a may operate in a second sensing mode SM2 for sensing the second input. During blank sections BP, the first and second sensing modes SM1 and SM2 may be activated.

Accordingly, during the second section AP2 of the odd-numbered display frames DF1 and DF3, the second switching unit SP2 may transmit detection driving signals for detecting the first input to the input sensor 200a. During the second section AP2 of the even-numbered display frames DF2 and DF4, the second switching unit SP2 may transmit an uplink signal ULS for detecting the second input to the input sensor 200a.

Referring to FIGS. 11 and 12C, the second switching unit SP2 and the third switching unit SP3 may be activated in each section within each display frame as a unit. The first enable signal ENb is activated during an image display section IDPa and is deactivated during a blank section BPa. Here, the activation section of the first enable signal ENb may be the first section AP1. The second enable signal EN1 is activated in the blank section BPa and is deactivated during the image display section IDPa. Here, the activation section of the second enable signal EN1 may be the second section AP2. The third enable signal EN2 is activated in the blank section BPa and is deactivated during the image display section IDPa. Here, the activation section of the third enable signal EN2 may be the third section AP3.

As an example of the inventive concept, the duration of each of the second section AP2 and the third section AP3 may be smaller than the duration of the blank section BPa. The duration of the second section AP2 may be the same as or different from the duration of the third section AP3.

During the first section AP1, the first switching unit SP1 is turned on so that the display panel 100 (refer to FIG. 4) operates in the image display mode IDM for displaying an image. During the first section AP1, the second and third switching units SP2 and SP3 may be maintained in a turned-off state. Thereafter, the second switching unit SP2 is turned on during the second section AP2 so that the input sensor 200 may operate in the first detection mode SM1 for detecting the first input. During the second section AP2, the first and third switching units SP1 and SP3 may be maintained in a turned-off state. In the first detection mode SM1, the second switching unit SP2 may transmit detection driving signals to the input sensor 200.

After that, the third switching unit SP3 is turned on during the third section AP3 so that the external input sensor may operate in the second detection mode SM2 for detecting the second input. During the third section AP3, the first and second switching units SP1 and SP2 may be maintained in a turned-off state. In the second detection mode SM2, the third switching unit SP3 may transmit an external detection signal to an external input sensor.

Figure 13A:
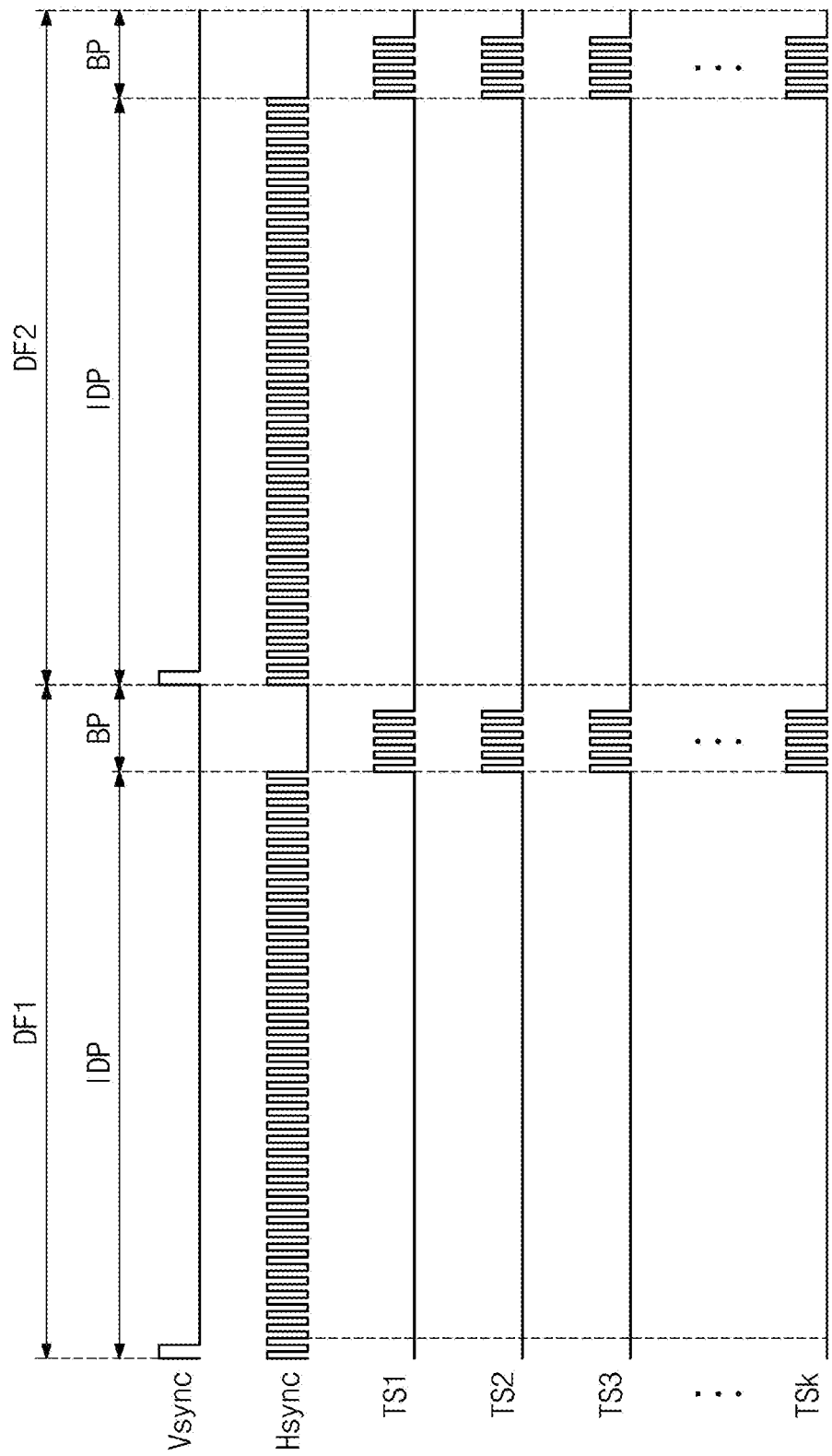
FIGS. 13A and 13B are waveform diagrams for explaining an operation of an input sensor according to an embodiment of the inventive concept.
Figure 13B:
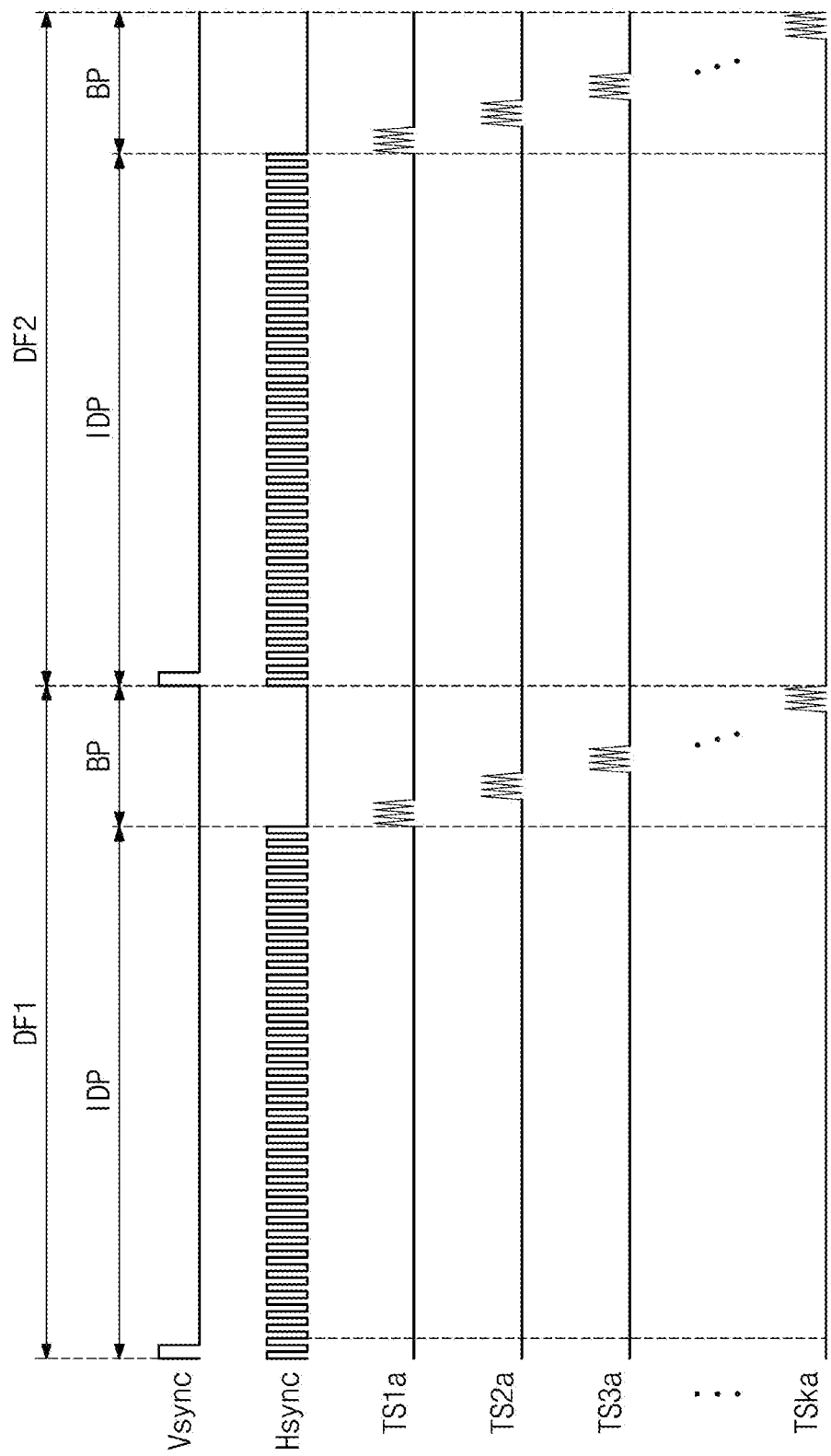

FIGS. 13A and 13B are waveform diagrams for explaining an operation of an input sensor according to an embodiment of the inventive concept.

Referring to FIGS. 4 and 13A, the selection circuit 100C4 may provide first to k-th detection driving signals TS1 to TSk to the transmission electrodes TE1 to TEk. The first to k-th detection driving signals TS1 to TSk may be simultaneously output from the selection circuit 100C4 at the start time of the blank section BP. As an example of the inventive concept, each of the first to k-th detection driving signals TS1 to TSk may have a square wave structure. However, the embodiment of the inventive concept is not limited thereto. Each of the first to k-th detection driving signals TS1 to TSk may have a triangular wave or sine wave structure. In addition, each of the first to k-th detection driving signals TS1 to TSk may be generated by the data conversion unit 100C33 (refer to FIG. 8) through various encoding techniques.

Although FIG. 13A illustrates a structure in which the first to k-th transmission signals TS1 to TSk are simultaneously output from the selection circuit 100C4, the inventive concept is not limited thereto. As shown in FIG. 13B, each of the first to k-th transmission signals TS1a to TSka may be sequentially output.

According to an embodiment of the inventive concept, the data driving circuit selectively outputs data signals for image display and detection driving signals for input sensing, and the selection circuit provides data signals to the display panel in response to the enable signal and provides detection driving signals to the input sensor. Accordingly, a circuit for input sensing and image display may be shared, and as a result, the configuration of a driving system of the display device may be simplified and the overall size of the circuit may be reduced.

Although embodiments of the inventive concept have been described, it is understood that the inventive concept should not be limited to these embodiments but various changes and modifications may be made thereto by one ordinary skilled in the art within the spirit and scope of the inventive concept as hereinafter claimed.

What is claimed is:

1. A display device, comprising:
   a display panel including a plurality of pixels;
   an input sensor disposed on the display panel and including detection electrodes;
   a data driving circuit comprising an output circuit configured to output data signals or detection driving signals; and
   a selection circuit configured to receive the data signals or the detection driving signals from the output circuit and provide the data signals to the plurality of pixels in response to a first enable signal and provide the detection driving signals to the detection electrodes in response to a second enable signal.

2. The display device of claim 1, wherein the data driving circuit further comprises:
   a data conversion circuit configured to convert image data into the data signals during a first section and convert detection driving data into the detection driving signals during a second section,
   wherein the output circuit outputs the data signals provided from the data conversion circuit during the first section and output the detection driving signals provided from the data conversion circuit during the second section.

3. The display device of claim 2, wherein the display panel displays an image during a plurality of display frames,
   wherein each of the plurality of display frames comprises an image display section and a blank section.

4. The display device of claim 3, wherein the first section corresponds to the image display section, and the second section is included in the blank section.

5. The display device of claim 3, wherein the data conversion circuit converts external driving data into external detection signals during a third section,
   wherein the output circuit outputs the external detection signals during the third section.

6. The display device of claim 5, wherein the first section corresponds to the image display section, and the second and third sections are included in the blank section.

7. The display device of claim 5, wherein the first section corresponds to the image display section,
   wherein the second section is included in the blank section of a first display frame among the plurality of display frames,
   wherein the third section is included in the blank section of a second display frame among the plurality of display frames.

8. The display device of claim 5, wherein the selection circuit provides the external detection signals to external detection electrodes in response to a third enable signal during the third section.

9. The display device of claim 2, wherein the selection circuit comprises:
   a first switching circuit connected between the display panel and the output circuit; and
   a second switching circuit connected between the input sensor and the output circuit.

10. The display device of claim 9, wherein the output circuit comprises m output buffers (where m is an integer greater than or equal to 1),
    wherein the first switching circuit comprises m first switching elements respectively connected to output terminals of the m output buffers,
    wherein the second switching circuit comprises m second switching elements respectively connected to output terminals of the m output buffers.

11. The display device of claim 10, wherein during the first section, the m first switching elements are turned on, and the m second switching elements are turned off,
    wherein during the second section, the m second switching elements are turned on, and the m first switching elements are turned off.

12. The display device of claim 9, wherein the output circuit comprises m output buffers (where m is an integer greater than or equal to 1),
    wherein the first switching circuit comprises a number of first switching elements greater than 1 and less than m,
    wherein the second switching circuit comprises a number of second switching elements greater than 1 and less than m.

13. The display device of claim 2, wherein the data driving circuit further comprises a gamma voltage generation circuit for generating a gamma voltage, wherein the data conversion circuit converts the image data and the detection driving data into the data signals and the detection driving signals, respectively, based on the gamma voltage.

14. The display device of claim 1, wherein the selection circuit is disposed directly on the display panel.

15. An electronic device, comprising:
a display panel including a plurality of pixels;
an input sensor disposed on the display panel and including detection electrodes; and
a driving integrated circuit connected to the display panel and the input sensor,
wherein the driving integrated circuit includes:
a data driving circuit comprising an output circuit configured to output data signals or detection driving signals; and
a selection circuit configured to receive the data signals or the detection driving signals from the output circuit and provide the data signals to the plurality of pixels in response to a first enable signal and provide the detection driving signals to the detection electrodes in response to a second enable signal.

16. The electronic device of claim 15, wherein the data driving circuit further comprises:
a data conversion circuit configured to convert image data into the data signals during a first section and convert detection driving data into the detection driving signals during a second section,
wherein the output circuit outputs the data signals provided from the data conversion circuit during the first section and output the detection driving signals provided from the data conversion circuit during the second section.

17. The electronic device of claim 16, wherein the display panel displays an image during a plurality of display frames,
wherein each of the plurality of display frames comprises an image display section and a blank section.

18. The electronic device of claim 17, wherein the first section corresponds to the image display section, and the second section is included in the blank section.

19. The electronic device of claim 16, wherein the selection circuit comprises:
a first switching circuit connected between the display panel and the output circuit; and
a second switching circuit connected between the input sensor and the output circuit.

20. The electronic device of claim 19, wherein the output circuit comprises m output buffers (where m is an integer greater than or equal to 1),
wherein the first switching circuit comprises m first switching elements respectively connected to the output terminals of the m output buffers,
wherein the second switching circuit comprises m second switching elements respectively connected to the output terminals of the m output buffers.

* * * * *